United States Patent
Chang et al.

(10) Patent No.: US 11,825,002 B2
(45) Date of Patent: Nov. 21, 2023

(54) DYNAMIC USER INTERFACE SCHEMES FOR AN ELECTRONIC DEVICE BASED ON DETECTED ACCESSORY DEVICES

(71) Applicant: Apple Inc., Cupertino, CA (US)

(72) Inventors: Jae Woo Chang, Cupertino, CA (US); Arian Behzadi, San Francisco, CA (US); Deena Khattab, San Francisco, CA (US); Robert Garcia, III, San Francisco, CA (US); Lauren E. Tappana, San Francisco, CA (US); Marcel Van Os, Santa Cruz, CA (US); Alan C. Dye, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/498,562

(22) Filed: Oct. 11, 2021

(65) Prior Publication Data

US 2022/0116494 A1  Apr. 14, 2022

Related U.S. Application Data

(60) Provisional application No. 63/090,649, filed on Oct. 12, 2020.

(51) Int. Cl.
*H04M 1/72409* (2021.01)
*H04M 1/7246* (2021.01)
(Continued)

(52) U.S. Cl.
CPC ...... *H04M 1/72409* (2021.01); *G06F 3/0481* (2013.01); *G06F 3/0482* (2013.01);
(Continued)

(58) Field of Classification Search
CPC .. H04M 1/72409; H04M 1/7246; H04M 1/04; H04M 1/72454; G06F 3/04817; G06F 3/0482; G06F 3/165
See application file for complete search history.

(56) References Cited

U.S. PATENT DOCUMENTS 6,104,808 A * 8/2000 Alameh ............... H04M 1/03
379/433.02
8,358,513 B2  1/2013 Kim
(Continued)

FOREIGN PATENT DOCUMENTS

CN  108933852  12/2018
EP  2977880  1/2016
(Continued)

OTHER PUBLICATIONS

Anonymous, "What's New In Apple's iPad Pro 11-inch tablet? full review!", Apr. 24, 2020, https://techmate-tips.com/whats-new-and-improved-in-new-apple-ipad-pro-tablet-full-review, 8 pages.
(Continued)

*Primary Examiner* — Justin R. Blaufeld
(74) *Attorney, Agent, or Firm* — Brownstein Hyatt Farber Schreck, LLP

(57) ABSTRACT

A method includes, at a computer system with a display and a housing, while a call is ongoing between the computer system and a remote device, detecting a coupling of a case to the computer system, and in response to detecting the coupling of the case to the computer system, in accordance with a determination that the computer system is operating in a first audio mode, continuing the call, and, in accordance with a determination that the computer system is operating in a second audio mode different than the first audio mode, terminating the call.

23 Claims, 21 Drawing Sheets

(51) Int. Cl.
   *G06F 3/04817* (2022.01)
   *G06F 3/0482* (2013.01)
   *H04M 1/04* (2006.01)
   *G06F 3/16* (2006.01)
   *H04M 1/72454* (2021.01)
   *G06F 3/0481* (2022.01)

(52) U.S. Cl.
   CPC .............. *G06F 3/165* (2013.01); *H04M 1/04* (2013.01); *H04M 1/7246* (2021.01); *H04M 1/72454* (2021.01)

(56) References Cited

U.S. PATENT DOCUMENTS

| | | | |
|---|---|---|---|
| 8,432,262 B2 | 4/2013 | Talty | |
| 8,838,024 B2 | 9/2014 | Iwasaki et al. | |
| 8,949,734 B2 | 2/2015 | Stallings et al. | |
| 8,964,364 B2 | 2/2015 | Abdelsamie et al. | |
| 9,065,932 B2 | 6/2015 | Abdelsamie et al. | |
| 9,167,375 B2 | 10/2015 | Geris et al. | |
| 9,389,638 B2 | 7/2016 | Abdelsamie et al. | |
| 9,389,641 B2 | 7/2016 | Jayetileke et al. | |
| 9,405,319 B2 | 8/2016 | Salo et al. | |
| 9,471,270 B2 | 10/2016 | Lee et al. | |
| 9,923,587 B2 | 3/2018 | Aldana et al. | |
| 10,630,826 B2 | 4/2020 | Ishida et al. | |
| 10,838,462 B1 | 11/2020 | Monaco | |
| 2003/0046401 A1 | 3/2003 | Abbott et al. | |
| 2008/0227505 A1* | 9/2008 | Jang | H04M 1/0245 455/575.1 |
| 2008/0253079 A1 | 10/2008 | Robinson et al. | |
| 2011/0192857 A1 | 8/2011 | Rothbaum et al. | |
| 2013/0304959 A1 | 11/2013 | Chiang et al. | |
| 2014/0075075 A1 | 3/2014 | Morrill et al. | |
| 2014/0256250 A1 | 9/2014 | Cueto et al. | |
| 2015/0156297 A1 | 6/2015 | Crawford et al. | |
| 2015/0172431 A1 | 6/2015 | Huang et al. | |
| 2016/0205237 A1* | 7/2016 | Baek | H04M 1/724092 455/575.8 |
| 2018/0176748 A1 | 6/2018 | Kim et al. | |
| 2022/0103675 A1 | 3/2022 | Hulbert et al. | |
| 2022/0150347 A1 | 5/2022 | Hulbert et al. | |

FOREIGN PATENT DOCUMENTS

| | | |
|---|---|---|
| KR | 200463713 | 11/2012 |
| WO | WO 15/047363 | 4/2015 |

OTHER PUBLICATIONS

U.S. Appl. No. 17/033,627, filed Sep. 25, 2020, Hulbert et al.
U.S. Appl. No. 17/033,641, filed Sep. 25, 2020, Hulbert et al.
The Verge, "Amazon's dock makes the Fire table a Better Echo Show," https://www.theverge.com/2018/7/12/17555248/amazon-show-mode-charging-dock-fire-tablet-review-specs-price, Jul. 12, 2018, 7 pages.
U.S. Appl. No. 17/583,902, filed Jan. 25, 2022, Hulbert et al.
U.S. Appl. No. 18/094,608, filed Jan. 9, 2023, Hulbert et al.
International Search Report and Written Opinion dated Mar. 17, 2022, PCT/US2021/054442, 16 pages.

* cited by examiner

1200

AT A COMPUTER SYSTEM WITH A DISPLAY, HOUSING, AND A WIRELESS ANTENNA, WHILE THE COMPUTER SYSTEM IS COUPLED TO A CASE, DETECTING, VIA THE WIRELESS ANTENNA, THE PRESENCE OF A WIRELESS TERMINAL, WHEREIN A FIRST REGION OF THE DISPLAY OF THE COMPUTER SYSTEM IS VISIBLE WHEN THE COMPUTER SYSTEM IS COUPLED TO THE CASE. — 1202

IN RESPONSE TO DETECTING THE PRESENCE OF THE WIRELESS TERMINAL THAT IS ASSOCIATED WITH A RESPECTIVE TYPE OF SECURE CREDENTIAL, AND IN ACCORDANCE WITH A DETERMINATION THAT THE DETECTION OF THE PRESENCE OF THE WIRELESS TERMINAL MEETS RESPECTIVE CRITERIA, WHEREIN THE RESPECTIVE CRITERIA INCLUDE A REQUIREMENT THAT COMPUTER SYSTEM IS NOT ABLE TO PROVIDE INFORMATION CORRESPONDING TO THE SECURE CREDENTIAL TO THE WIRELESS TERMINAL IN RESPONSE TO DETECTING THE PRESENCE OF THE WIRELESS TERMINAL IN ORDER FOR THE RESPECTIVE CRITERIA TO BE MET, DISPLAYING, IN THE FIRST PORTION REGION OF THE DISPLAY, A PROMPT TO UNCOUPLE THE COMPUTER SYSTEM FROM THE CASE. — 1204

IN RESPONSE TO DETECTING THE PRESENCE OF THE WIRELESS TERMINAL THAT IS ASSOCIATED WITH A RESPECTIVE TYPE OF SECURE CREDENTIAL, AND IN ACCORDANCE WITH A DETERMINATION THAT THE PRESENCE OF THE WIRELESS TRANSMISSION DOES NOT MEET THE RESPECTIVE CRITERIA, PROVIDING, VIA THE WIRELESS ANTENNA, THE INFORMATION CORRESPONDING TO THE SECURE CREDENTIAL TO THE WIRELESS TERMINAL — 1206

*FIG. 12*

DYNAMIC USER INTERFACE SCHEMES FOR AN ELECTRONIC DEVICE BASED ON DETECTED ACCESSORY DEVICES

CROSS-REFERENCE TO RELATED APPLICATION

This application is a nonprovisional of, and claims the benefit under 35 U.S.C. § 119(e) of, U.S. Patent Application No. 63/090,649, filed Oct. 12, 2020, the contents of which are incorporated herein by reference as if fully disclosed herein.

FIELD

The described embodiments relate generally to electronic devices, and more particularly to electronic devices that detect when they are in use with certain accessories.

BACKGROUND

Handheld electronic devices such as mobile phones and tablet computers provide numerous functions and features, and use graphical user interfaces to allow users to interact with and control those functions and features. For example, handheld electronic devices display input objects such as icons, buttons, keys, and other graphical objects with which a user may interact to control the devices and their various functions. The devices may also display output objects, such as text or images, that convey information to the user.

SUMMARY

A method includes, at a computer system with a display and a housing and while a call is ongoing between the computer system and a remote device, detecting a coupling of a case to the computer system, and, in response to detecting the coupling of the case to the computer system, in accordance with a determination that the computer system is operating in a first audio mode, continuing the call, and in accordance with a determination that the computer system is operating in a second audio mode different than the first audio mode, terminating the call.

The first audio mode may be a speakerphone mode in which the computer system is configured to produce an audio output that is audible to a user when the computer system is away from the user's ear.

Operating in the first audio mode may include transmitting audio associated with the call to a remote speaker communicatively coupled to the computer system. The remote speaker may be communicatively coupled to the computer system via a wireless communication link. The remote speaker may be communicatively coupled to the computer system via a wired connection.

The second audio mode may be a handset mode in which the computer system is configured to produce an audio output using an earpiece speaker configured to be placed adjacent a user's ear.

The method may further include, while the call is ongoing, outputting, via at least one of a speaker of the computer system or a remote speaker communicatively coupled to the computer system, audio content associated with the call, and displaying, on the display, video content associated with the call, and, in response to detecting the coupling of the case to the computer system and in accordance with the determination that the computer system is operating in the first audio mode, ceasing display of the video content and continuing to output the audio content.

The call may be a first call, the remote device may be a first remote device, and while the first call is ongoing and the method may include, while a second call between the computer system and a second remote device is ongoing, in response to detecting the coupling of the case to the computer system and in accordance with the determination that the computer system is operating in the first audio mode, displaying first call information associated with the first call in a first region of the display and displaying second call information associated with the second call in the first region of the display. The first region of the display may be visible through an opening in the case and a second region of the display is covered by the case.

The method may further include, in response to detecting the coupling of the case to the computer system and in accordance with the determination that the computer system is operating in the second audio mode, after terminating the call, displaying, in a first region of the display, a visual indication that the call has been terminated, wherein the first region of the display is visible through an opening in the case, and a second region of the display is covered by the case.

The method may further include, in response to detecting the coupling of the case to the computer system and in accordance with the determination that the computer system is operating in the first audio mode, displaying, in a first region of the display, a visual indication including information about the call, wherein the first region of the display is visible through an opening in the case, and a second region of the display is covered by the case.

The method may further include, prior to detecting the coupling of the case to the computer system and while the call is ongoing, displaying, on the display, a visual indication including call information associated with the call, and in response to detecting the coupling of the case to the computer system, reducing a size of the visual indication and displaying the reduced-size visual indication in a first region of the display, wherein the first region of the display is visible through an opening in the case and a second region of the display is covered by the case.

The method may further include, in response to detecting the coupling of the case to the computer system and in accordance with a determination that the computer system is in a first state corresponding to a first authorization level when the coupling of the case is detected, transitioning the computer system to a second state corresponding to a second authorization level different than the first authorization level.

The call may be a first call, the case may be a first case of a first type, the remote device may be a first remote device, and the method may further include, while a second call is ongoing between the computer system and a second remote device, detecting a coupling of a second case to the computer system, the second case of a second type different than the first type, and in response to detecting the coupling of the second case to the computer system and in accordance with a determination that the computer system is operating in the first audio mode or the second audio mode, continuing the call.

An electronic device includes a display, a housing, one or more processors, memory, and one or more programs stored in the memory and configured to be executed by the one or more processors and including instructions for, while a call is ongoing between the electronic device and a remote device, detecting a coupling of a case to the electronic device, and in response to detecting the coupling of the case to the electronic device, in accordance with a determination that the electronic device is operating in a first audio mode, continuing the call, and in accordance with a determination that the electronic device is operating in a second audio mode different than the first audio mode, terminating the call.

The first audio mode may be a speakerphone mode in which the electronic device is configured to produce an audio output that is audible to a user when the electronic device is away from the user's ear.

Operating in the first audio mode may include transmitting audio associated with the call to a remote speaker communicatively coupled to the electronic device. The remote speaker may be communicatively coupled to the electronic device via a wireless communication link. The remote speaker may be communicatively coupled to the electronic device via a wired connection.

The second audio mode may be a handset mode in which the electronic device is configured to produce an audio output using an earpiece speaker configured to be placed adjacent a user's ear.

The one or more programs may further include instructions for, while the call is ongoing, outputting, via at least one of a speaker of the electronic device or a remote speaker communicatively coupled to the electronic device, audio content associated with the call, and displaying, on the display, video content associated with the call, and in response to detecting the coupling of the case to the electronic device and in accordance with the determination that the electronic device is operating in the first audio mode, ceasing display of the video content and continuing to output the audio content.

The call may be a first call, the remote device may be a first remote device, and the one or more programs may further include instructions for, while the first call is ongoing and while a second call between the electronic device and a second remote device is ongoing, in response to detecting the coupling of the case to the electronic device and in accordance with the determination that the electronic device is operating in the first audio mode, displaying first call information associated with the first call in a first region of the display, and displaying second call information associated with the second call in the first region of the display, wherein the first region of the display is visible through an opening in the case and a second region of the display is covered by the case.

The one or more programs may further include instructions for, in response to detecting the coupling of the case to the electronic device and in accordance with the determination that the electronic device is operating in the second audio mode, after terminating the call, displaying, in a first region of the display, a visual indication that the call has been terminated, wherein the first region of the display is visible through an opening in the case and a second region of the display is covered by the case.

The one or more programs may further including instructions for, in response to detecting the coupling of the case to the electronic device and in accordance with the determination that the electronic device is operating in the first audio mode, displaying, in a first region of the display, a visual indication including information about the call, wherein the first region of the display is visible through an opening in the case and a second region of the display is covered by the case.

The one or more programs may further include instructions for, prior to detecting the coupling of the case to the electronic device and while the call is ongoing, displaying, on the display, a visual indication including call information associated with the call, and in response to detecting the coupling of the case to the electronic device, reducing a size of the visual indication and displaying the reduced-size visual indication in a first region of the display, wherein the first region of the display is visible through an opening in the case and a second region of the display is covered by the case.

The one or more programs may further include instructions for, in response to detecting the coupling of the case to the electronic device and in accordance with a determination that the electronic device is in a first state corresponding to a first authorization level when the coupling of the case is detected, transitioning the electronic device to a second state corresponding to a second authorization level different than the first authorization level.

The call may be a first call, the case may be a first case of a first type, the remote device may be a first remote device, and the one or more programs may further include instructions for, while a second call is ongoing between the electronic device and a second remote device, detecting a coupling of a second case to the electronic device, the second case of a second type different than the first type, and in response to detecting the coupling of the second case to the electronic device and in accordance with a determination that the electronic device is operating in the first audio mode or the second audio mode, continuing the call.

A non-transitory computer readable storage medium may store one or more programs, the one or more programs comprising instructions, which when executed by an electronic device comprising a display and a housing, cause the electronic device to, while a call is ongoing between the electronic device and a remote device, detect a coupling of a case to the electronic device, and in response to detecting the coupling of the case to the electronic device, in accordance with a determination that the electronic device is operating in a first audio mode, continue the call, and in accordance with a determination that the electronic device is operating in a second audio mode different than the first audio mode, terminate the call.

The first audio mode may be a speakerphone mode in which the electronic device is configured to produce an audio output that is audible to a user when the electronic device is away from the user's ear.

Operating in the first audio mode may include transmitting audio associated with the call to a remote speaker communicatively coupled to the electronic device. The remote speaker may be communicatively coupled to the electronic device via a wireless communication link. The remote speaker may be communicatively coupled to the electronic device via a wired connection.

The second audio mode may be a handset mode in which the electronic device is configured to produce an audio output using an earpiece speaker configured to be placed adjacent a user's ear.

The one or more programs may further include instructions, which when executed by the electronic device, cause the electronic device to, while the call is ongoing, output, via at least one of a speaker of the electronic device or a remote speaker communicatively coupled to the electronic device, audio content associated with the call, and display, on the display, video content associated with the call, and in response to detecting the coupling of the case to the electronic device and in accordance with the determination that the electronic device is operating in the first audio mode, cease display of the video content, and continue to output the audio content.

The call may be a first call, the remote device may be a first remote device, and the one or more programs may further include instructions, which when executed by the electronic device, cause the electronic device to, while the first call is ongoing and while a second call between the electronic device and a second remote device is ongoing, in response to detecting the coupling of the case to the electronic device and in accordance with the determination that the electronic device is operating in the first audio mode, display first call information associated with the first call in a first region of the display and display second call information associated with the second call in the first region of the display, wherein the first region of the display is visible through an opening in the case and a second region of the display is covered by the case.

The one or more programs may further include instructions, which when executed by the electronic device, cause the electronic device to, in response to detecting the coupling of the case to the electronic device and in accordance with the determination that the electronic device is operating in the second audio mode, after terminating the call, display, in a first region of the display, a visual indication that the call has been terminated, wherein the first region of the display is visible through an opening in the case and a second region of the display is covered by the case.

The one or more programs may further include instructions, which when executed by the electronic device, cause the electronic device to, in response to detecting the coupling of the case to the electronic device and in accordance with the determination that the electronic device is operating in the first audio mode, display, in a first region of the display, a visual indication including information about the call, wherein the first region of the display is visible through an opening in the case and a second region of the display is covered by the case.

The one or more programs may further include instructions, which when executed by the electronic device, cause the electronic device to, prior to detecting the coupling of the case to the electronic device and while the call is ongoing, display, on the display, a visual indication including call information associated with the call, and in response to detecting the coupling of the case to the electronic device, reduce a size of the visual indication and display the reduced-size visual indication in a first region of the display, wherein the first region of the display is visible through an opening in the case and a second region of the display is covered by the case.

The one or more programs may further include instructions, which when executed by the electronic device, cause the electronic device to, in response to detecting the coupling of the case to the electronic device and in accordance with a determination that the electronic device is in a first state corresponding to a first authorization level when the coupling of the case is detected, transition the electronic device to a second state corresponding to a second authorization level different than the first authorization level.

The call may be a first call, the case may be a first case of a first type, the remote device may be a first remote device, and the one or more programs may further include instructions, which when executed by the electronic device, cause the electronic device to, while a second call is ongoing between the electronic device and a second remote device, detect a coupling of second case to the electronic device, the second case of a second type different than the first type, and in response to detecting the coupling of the second case to the electronic device and in accordance with a determination that the electronic device is operating in the first audio mode or the second audio mode, continue the call.

A method includes, at a computer system with a display and a housing, detecting an incoming call. The method further includes, in response to detecting the incoming call, outputting an incoming call alert, wherein outputting the incoming call alert includes at least one of generating an audible output or generating a haptic output to indicate the presence of the incoming call, while the incoming call alert is active, detecting a coupling of a case to the computer system, wherein at least a portion of the display is covered by the case, and, in response to detecting the coupling of the case to the computer system while the incoming call alert is active, ceasing to produce the at least one of the audible output or the haptic output.

The method may further include, in response to detecting the coupling of the case to the computer system while the incoming call alert is active, ceasing to produce the at least one of the audible output or the haptic output without declining the incoming call. The method may further include, after detecting the coupling of a case to the computer system and after ceasing to produce the at least one of the audible output or the haptic output, detecting an accept-call input, and in response to detecting the accept-call input, accepting the call.

Outputting the incoming call alert may include displaying, on the display, a visual indication including information about the incoming call. The visual indication may be a first visual indication, and the method may further include, in response to detecting the coupling of the case to the computer system while the incoming call alert is active, displaying a second visual indication in a first region of the display, wherein the first region of the display is visible through an opening in the case, and a second region of the display is covered by the case. The second visual indication may have a smaller size than the first visual indication.

The method may further include, in response to detecting the coupling of the case to the computer system and in accordance with a determination that the computer system is in a first state corresponding to a first authorization level when the coupling of the case is detected, transitioning the computer system to a second state corresponding to a second authorization level different than the first authorization level.

An electronic device may include a display, a housing, one or more processors, memory, and one or more programs stored in the memory and configured to be executed by the one or more processors and including instructions for detecting an incoming call, in response to detecting the incoming call, outputting an incoming call alert, wherein outputting the incoming call alert includes at least one of generating an audible output or generating a haptic output to indicate the presence of the incoming call, while the incoming call alert is active, detecting a coupling of a case to the electronic device, wherein at least a portion of the display is covered by the case, and in response to detecting the coupling of the case to the electronic device while the incoming call alert is active, ceasing to produce the at least one of the audible output or the haptic output.

The one or more programs may further include instructions for, in response to detecting the coupling of the case to the electronic device while the incoming call alert is active, ceasing to produce the at least one of the audible output or the haptic output without declining the incoming call.

The one or more programs may further include instructions for, after detecting the coupling of a case to the electronic device and after ceasing to produce the at least one of the audible output or the haptic output, detecting an accept-call input, and in response to detecting the accept-call input, accepting the call. Outputting the incoming call alert may include displaying, on the display, a visual indication including information about the incoming call.

The visual indication may be a first visual indication, and the one or more programs may further include instructions for, in response to detecting the coupling of the case to the electronic device while the incoming call alert is active, displaying a second visual indication in a first region of the display, wherein the first region of the display is visible through an opening in the case and a second region of the display is covered by the case. The second visual indication may have a smaller size than the first visual indication.

The one or more programs may further include instructions for, in response to detecting the coupling of the case to the electronic device and in accordance with a determination that the electronic device is in a first state corresponding to a first authorization level when the coupling of the case is detected, transitioning the electronic device to a second state corresponding to a second authorization level different than the first authorization level.

A non-transitory computer readable storage medium may store one or more programs, the one or more programs comprising instructions, which when executed by an electronic device comprising a display and a housing, cause the electronic device to detect an incoming call, in response to detecting the incoming call, output an incoming call alert, wherein outputting the incoming call alert includes at least one of generating an audible output or generating a haptic output to indicate the presence of the incoming call, while the incoming call alert is active, detect a coupling of a case to the electronic device, wherein at least a portion of the display is covered by the case, and in response to detecting the coupling of the case to the electronic device while the incoming call alert is active, cease producing the at least one of the audible output or the haptic output.

The one or more programs may further include instructions, which when executed by the electronic device, cause the electronic device to, in response to detecting the coupling of the case to the electronic device while the incoming call alert is active, cease producing the at least one of the audible output or the haptic output without declining the incoming call.

The one or more programs may further include instructions, which when executed by the electronic device, cause the electronic device to, after detecting the coupling of a case to the electronic device and after ceasing to produce the at least one of the audible output or the haptic output, detect an accept-call input, and in response to detecting the accept-call input, accept the call. Outputting the incoming call alert may include displaying, on the display, a visual indication including information about the incoming call.

The visual indication may be a first visual indication, and the one or more programs may further include instructions, which when executed by the electronic device, cause the electronic device to, in response to detecting the coupling of the case to the electronic device while the incoming call alert is active, display a second visual indication in a first region of the display, wherein the first region of the display is visible through an opening in the case, and a second region of the display is covered by the case. The second visual indication may have a smaller size than the first visual indication.

The one or more programs may further include instructions, which when executed by the electronic device, cause the electronic device to, in response to detecting the coupling of the case to the electronic device and in accordance with a determination that the electronic device is in a first state corresponding to a first authorization level when the coupling of the case is detected, transition the electronic device to a second state corresponding to a second authorization level different than the first authorization level.

A method includes, at a computer system with a display, a housing, and a wireless antenna and while the computer system is coupled to a case, detecting, via the wireless antenna, the presence of a wireless terminal, wherein a first region of the display of the computer system is visible when the computer system is coupled to the case. The method includes, in response to detecting the presence of the wireless terminal that is associated with a respective type of secure credential and in accordance with a determination that the detection of the presence of the wireless terminal meets respective criteria, wherein the respective criteria include a requirement that the computer system is not able to provide information corresponding to the secure credential to the wireless terminal in response to detecting the presence of the wireless terminal in order for the respective criteria to be met, displaying, in the first region of the display, a prompt to uncouple the computer system from the case.

The method may include, in response to detecting the presence of the wireless terminal that is associated with the respective type of secure credential, in accordance with a determination that the presence of the wireless terminal does not meet the respective criteria, providing, via the wireless antenna, the information corresponding to the secure credential to the wireless terminal.

The respective criteria may be met when first information corresponding to a first secure credential was provided to the wireless terminal in response to a first detection of the presence of the wireless terminal, and a second detection of the presence of the wireless terminal is detected after providing the first information corresponding to the first secure credential to the wireless terminal.

The respective criteria may be met when the computer system failed to provide the information corresponding to the secure credential to the wireless terminal in response to a first detection of the presence of the wireless terminal, a second detection of the presence of the wireless terminal is detected after failing to provide the information corresponding to the secure credential to the wireless terminal, and the computer system is not able to provide the information corresponding to the secure credential to the wireless terminal in response to the second detection of the presence of the wireless terminal.

The respective criteria may be met when the computer system fails to provide the information corresponding to the secure credential to the wireless terminal in response to detection of the presence of the wireless terminal.

The method may further include, after displaying the prompt to uncouple the computer system from the case, detecting that the computer system has been uncoupled from the case, and in response to detecting that the computer system has been uncoupled from the case, displaying a user interface associated with providing information corresponding to a secure credential to the wireless terminal. The computer system may have already provided first information corresponding to a first secure credential to the wireless terminal, the computer system may have access to information corresponding to a second secure credential that is available to be provided to the wireless terminal, and the user interface associated with providing information corresponding to a secure credential to the wireless terminal may be a user interface associated with providing the information corresponding to the second secure credential to the wireless terminal.

The method may further include, while displaying the user interface associated with providing the information corresponding to the second secure credential to the wireless terminal, detecting the presence of the wireless terminal, and in response to detecting the presence of the wireless terminal, providing, via the wireless antenna, the information corresponding to the second secure credential to the wireless terminal.

The computer system may have already provided first information corresponding to a first secure credential to the wireless terminal, and the method may further include, while displaying the user interface associated with providing the information corresponding to the second secure credential to the wireless terminal, detecting a navigation input directed to the user interface associated with providing the information corresponding to the second secure credential to the wireless terminal, and in response to detecting the navigation input directed to the user interface associated with providing the information corresponding to the second secure credential to the wireless terminal, displaying a user interface associated with the first secure credential.

The user interface associated with the first secure credential may include a visual indication that the information corresponding to the first secure credential has already been provided to the wireless terminal.

The method may further include, while displaying the user interface associated with providing the information corresponding to the second secure credential to the wireless terminal, detecting a navigation input directed to the user interface associated with providing the information corresponding to the second secure credential to the wireless terminal, and in response to detecting the navigation input directed to the user interface associated with providing the information corresponding to the second secure credential to the wireless terminal, displaying a user interface associated with a third secure credential that is different from the first secure credential and the second secure credential.

The method may further include, while displaying the user interface associated with providing information corresponding to the third secure credential to the wireless terminal, detecting the presence of the wireless terminal, and in response to detecting the presence of the wireless terminal, providing, via the wireless antenna, the information corresponding to the third secure credential to the wireless terminal.

The method may further include detecting that the computer system has been uncoupled from the case, and in response to detecting that the computer system has been uncoupled from the case, capturing biometric information of a user of the computer system, in accordance with a determination that the biometric information captured by the computer system is consistent with enrolled biometric information at the computer system, performing a secure operation, and in accordance with a determination that the biometric information captured by the computer system is not consistent with the enrolled biometric information at the computer system, forgoing performance of the secure operation.

The secure credential may be associated with a credential management application on the computer system that manages a plurality of secure credentials that are available for use in different situations.

An electronic device may include a display, a housing, a wireless antenna, one or more processors, memory, and one or more programs stored in the memory and configured to be executed by the one or more processors and including instructions for, while the electronic device is coupled to a case, detecting, via the wireless antenna, the presence of a wireless terminal, wherein a first region of the display of the electronic device is visible when the electronic device is coupled to the case, and in response to detecting the presence of the wireless terminal that is associated with a respective type of secure credential, in accordance with a determination that the detection of the presence of the wireless terminal meets respective criteria, wherein the respective criteria include a requirement that the electronic device is not able to provide information corresponding to the secure credential to the wireless terminal in response to detecting the presence of the wireless terminal in order for the respective criteria to be met, displaying, in the first region of the display, a prompt to uncouple the electronic device from the case.

The one or more programs may further include instructions for, in response to detecting the presence of the wireless terminal that is associated with a respective type of secure credential, in accordance with a determination that the presence of the wireless terminal does not meet the respective criteria, providing, via the wireless antenna, the information corresponding to the secure credential to the wireless terminal.

The respective criteria may be met when first information corresponding to a first secure credential was provided to the wireless terminal in response to a first detection of the presence of the wireless terminal and a second detection of the presence of the wireless terminal is detected after providing the first information corresponding to the first secure credential to the wireless terminal.

The respective criteria may be met when the electronic device failed to provide the information corresponding to the secure credential to the wireless terminal in response to a first detection of the presence of the wireless terminal, a second detection of the presence of the wireless terminal is detected after failing to provide the information corresponding to the secure credential to the wireless terminal, and the electronic device is not able to provide the information corresponding to the secure credential to the wireless terminal in response to the second detection of the presence of the wireless terminal.

The respective criteria may be met when the electronic device fails to provide the information corresponding to the secure credential to the wireless terminal in response to detection of the presence of the wireless terminal.

The one or more programs may further include instructions for, after displaying the prompt to uncouple the electronic device from the case, detecting that the electronic device has been uncoupled from the case, and in response to detecting that the electronic device has been uncoupled from the case, displaying a user interface associated with providing information corresponding to a secure credential to the wireless terminal. The electronic device may have already provided first information corresponding to a first secure credential to the wireless terminal, the electronic device may have access to information corresponding to a second secure credential that is available to be provided to the wireless terminal, and the user interface associated with providing information corresponding to a secure credential to the wireless terminal may be a user interface associated with providing the information corresponding to the second secure credential to the wireless terminal.

The one or more programs may further include instructions for, while displaying the user interface associated with providing the information corresponding to the second secure credential to the wireless terminal, detecting the presence of the wireless terminal, and in response to detecting the presence of the wireless terminal, providing, via the wireless antenna, the information corresponding to the second secure credential to the wireless terminal.

The electronic device may have already provided first information corresponding to a first secure credential to the wireless terminal, and the one or more programs may further include instructions for, while displaying the user interface associated with providing the information corresponding to the second secure credential to the wireless terminal, detecting a navigation input directed to the user interface associated with providing the information corresponding to the second secure credential to the wireless terminal, and in response to detecting the navigation input directed to the user interface associated with providing the information corresponding to the second secure credential to the wireless terminal, displaying a user interface associated with the first secure credential. The user interface associated with the first secure credential may include a visual indication that the information corresponding to the first secure credential has already been provided to the wireless terminal.

The one or more programs may further include instructions for, while displaying the user interface associated with providing the information corresponding to the second secure credential to the wireless terminal, detecting a navigation input directed to the user interface associated with providing the information corresponding to the second secure credential to the wireless terminal, and in response to detecting the navigation input directed to the user interface associated with providing the information corresponding to the second secure credential to the wireless terminal, displaying a user interface associated with a third secure credential that is different from the first secure credential and the second secure credential. The one or more programs may further include instructions for, while displaying the user interface associated with providing information corresponding to the third secure credential to the wireless terminal, detecting the presence of the wireless terminal, and in response to detecting the presence of the wireless terminal, providing, via the wireless antenna, the information corresponding to the third secure credential to the wireless terminal.

The one or more programs may further include instructions for detecting that the electronic device has been uncoupled from the case, in response to detecting that the electronic device has been uncoupled from the case, capturing biometric information of a user of the electronic device, in accordance with a determination that the biometric information captured by the electronic device is consistent with enrolled biometric information at the electronic device, performing a secure operation, and in accordance with a determination that the biometric information captured by the electronic device is not consistent with the enrolled biometric information at the electronic device, forgoing performance of the secure operation.

The secure credential may be associated with a credential management application on the electronic device that manages a plurality of secure credentials that are available for use in different situations.

A non-transitory computer readable storage medium may store one or more programs, the one or more programs comprising instructions, which when executed by an electronic device comprising a display, a housing, and a wireless antenna, cause the electronic device to, while the electronic device is coupled to a case, detect, via the wireless antenna, the presence of a wireless terminal, wherein a first region of the display of the electronic device is visible when the electronic device is coupled to the case, and in response to detecting the presence of the wireless terminal that is associated with a respective type of secure credential, in accordance with a determination that the detection of the presence of the wireless terminal meets respective criteria, wherein the respective criteria include a requirement that the electronic device is not able to provide information corresponding to the secure credential to the wireless terminal in response to detecting the presence of the wireless terminal in order for the respective criteria to be met, display, in the first region of the display, a prompt to uncouple the electronic device from the case.

The one or more programs may further include instructions, which when executed by the electronic device, cause the electronic device to, in response to detecting the presence of the wireless terminal that is associated with a respective type of secure credential, in accordance with a determination that the presence of the wireless terminal does not meet the respective criteria, provide, via the wireless antenna, the information corresponding to the secure credential to the wireless terminal.

The respective criteria may be met when first information corresponding to a first secure credential was provided to the wireless terminal in response to a first detection of the presence of the wireless terminal, and a second detection of the presence of the wireless terminal is detected after providing the first information corresponding to the first secure credential to the wireless terminal.

The respective criteria may be met when the electronic device failed to provide the information corresponding to the secure credential to the wireless terminal in response to a first detection of the presence of the wireless terminal, a second detection of the presence of the wireless terminal is detected after failing to provide the information corresponding to the secure credential to the wireless terminal, and the electronic device is not able to provide the information corresponding to the secure credential to the wireless terminal in response to the second detection of the presence of the wireless terminal.

The respective criteria may be met when the electronic device fails to provide the information corresponding to the secure credential to the wireless terminal in response to detection of the presence of the wireless terminal.

The one or more programs may further include instructions, which when executed by the electronic device, cause the electronic device to, after displaying the prompt to uncouple the electronic device from the case, detect that the electronic device has been uncoupled from the case, and in response to detecting that the electronic device has been uncoupled from the case, display a user interface associated with providing information corresponding to a secure credential to the wireless terminal. The electronic device may have already provided first information corresponding to a first secure credential to the wireless terminal, the electronic device may have access to information corresponding to a second secure credential that is available to be provided to the wireless terminal, and the user interface may be associated with providing information corresponding to a secure credential to the wireless terminal is a user interface associated with providing the information corresponding to the second secure credential to the wireless terminal.

The one or more programs may further include instructions, which when executed by the electronic device, cause the electronic device to, while displaying the user interface associated with providing the information corresponding to the second secure credential to the wireless terminal, detect the presence of the wireless terminal, and in response to detecting the presence of the wireless terminal, provide, via the wireless antenna, the information corresponding to the second secure credential to the wireless terminal. The electronic device may have already provided first information corresponding to a first secure credential to the wireless terminal, and the one or more programs may further include instructions, which when executed by the electronic device, cause the electronic device to, while displaying the user interface associated with providing the information corresponding to the second secure credential to the wireless terminal, detect a navigation input directed to the user interface associated with providing the information corresponding to the second secure credential to the wireless terminal, and in response to detecting the navigation input directed to the user interface associated with providing the information corresponding to the second secure credential to the wireless terminal, display a user interface associated with the first secure credential.

The user interface associated with the first secure credential may include a visual indication that the information corresponding to the first secure credential has already been provided to the wireless terminal.

The one or more programs may further include instructions, which when executed by the electronic device, cause the electronic device to, while displaying the user interface associated with providing the information corresponding to the second secure credential to the wireless terminal, detect a navigation input directed to the user interface associated with providing the information corresponding to the second secure credential to the wireless terminal, and in response to detecting the navigation input directed to the user interface associated with providing the information corresponding to the second secure credential to the wireless terminal, display a user interface associated with a third secure credential that is different from the first secure credential and the second secure credential.

The one or more programs may further include instructions, which when executed by the electronic device, cause the electronic device to, while displaying the user interface associated with providing information corresponding to the third secure credential to the wireless terminal, detect the presence of the wireless terminal, and in response to detecting the presence of the wireless terminal, provide, via the wireless antenna, the information corresponding to the third secure credential to the wireless terminal.

The one or more programs may further include instructions, which when executed by the electronic device, cause the electronic device to detect that the electronic device has been uncoupled from the case, in response to detecting that the electronic device has been uncoupled from the case, capture biometric information of a user of the electronic device, in accordance with a determination that the biometric information captured by the electronic device is consistent with enrolled biometric information at the electronic device, perform a secure operation, and in accordance with a determination that the biometric information captured by the electronic device is not consistent with the enrolled biometric information at the electronic device, forgo performance of the secure operation.

The secure credential may be associated with a credential management application on the electronic device that manages a plurality of secure credentials that are available for use in different situations.

BRIEF DESCRIPTION OF THE DRAWINGS

The disclosure will be readily understood by the following detailed description in conjunction with the accompanying drawings, wherein like reference numerals designate like structural elements, and in which:

FIG. 12 is a flow chart of another method for use with a computer system; and

DETAILED DESCRIPTION

Figure 1A:
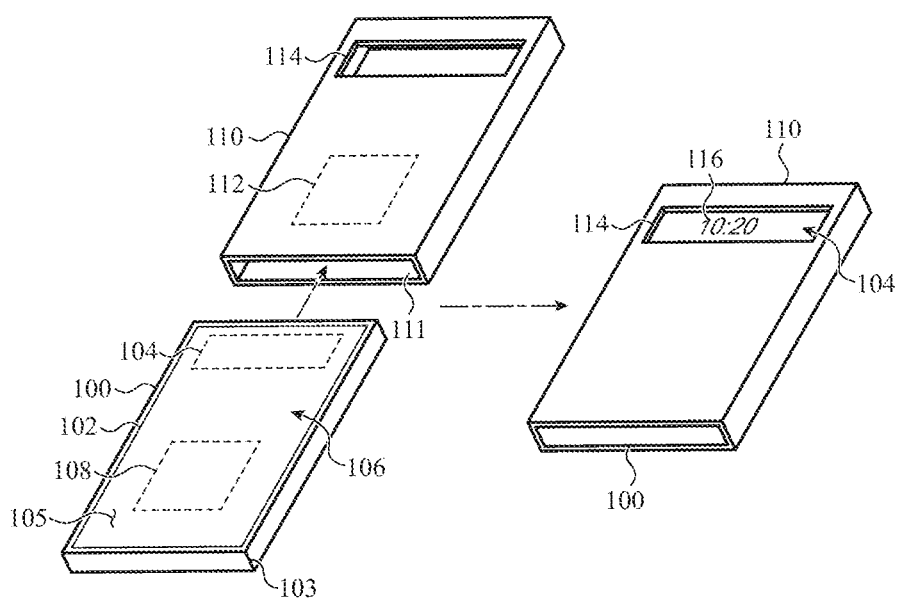
FIG. 1A depicts an example electronic device in use with an example case.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to a system of electronic devices and electronic device accessories, such as cases, in which the device can detect a coupling of the accessory to the device and change, modify, or otherwise control the operation of the device in certain ways based on the detected coupling of the accessory to the device. For example, in response to detecting that a case has been coupled to the device, the device may change what is displayed on a display of a device. As one particular example, when a device is inserted into a case that covers a first region of a display of the device, while leaving a second region uncovered or otherwise visible, the device may transition from displaying a full-screen user interface to displaying a partial-screen user interface in the second (e.g., uncovered) region of the display.

Instead of or in addition to changing the user interface or other graphical output, the device may take other actions in response to detecting that a case has been coupled to the device, and such actions may be based on a status of the device when the case is coupled to the device. For example, in some implementations, if a voice call (e.g., a telephone call) is ongoing when the case is coupled to the device, the device will terminate the call when detecting that the case has been coupled to the device. The audio mode of the device may also affect how the device responds when a case is coupled to the device. For example, in some implementations, if the device is being used in a handset mode during a call (e.g., the device is being held against a user's ear) when the case is attached, the device terminates the call, but if the device is being used in a hands-free mode (e.g., speakerphone), the device does not terminate the call. Other types of actions that affect the operation of the device may also be performed in response to detecting that a case has been coupled to the device.

In some implementations, a device as described herein uses near-field wireless communication techniques to detect the coupling of cases or other accessories to the device. For example, in some implementations, protective cases include near-field wireless communication antennas, and the devices include near-field wireless communication systems that can detect when the device is in close proximity to the near-field wireless antennas (e.g., the device can detect when it has been installed in, coupled to, or is otherwise being used with a particular case). In some implementations, the device receives, from the near-field wireless communication antenna, information about the case, such as a unique identifier of the case, physical properties of the case, or the like. Once the device detects that a particular case has been coupled to the device, the device changes its mode of operation in a manner that is unique to that particular case (and that is optionally based on a status or mode of the device when the case is coupled to the device).

The near-field wireless communication systems and antennas may be configured so that an accessory is detected by a device only when the device is sufficiently close that it is substantially certain that the device and the accessory are being used together. For example, in the case of a protective case for a mobile phone, the mobile phone detects the presence of the case only once the phone is inserted into the protective case. Further, in some implementations, the near-field wireless communication antennas are passive or un-powered antennas, allowing dynamic device customization to occur even with un-powered accessories. As used herein, passive or un-powered antennas refer to antennas that are not conductively coupled to an electrical power supply of the accessory. Accordingly, a protective case need not have batteries or independently powered communications systems (e.g., WIFI or Bluetooth) in order to change the operational mode or other characteristic of the electronic device.

FIG. 1A depicts an example electronic device 100 (also referred to herein simply as a "device") and an example case 110 that may be coupled to the device 100. The electronic device 100 is an example of a computer system, such as the computer system described herein with respect to FIG. 13. The device 100 shown in FIG. 1A is a mobile phone (e.g., a smartphone), but this is merely one representative example of a device that may be used in conjunction with the ideas disclosed herein. Other example devices include, without limitation, music/media players, tablet computers, and the like.

The device 100 includes a housing structure 103 that defines at least some of the exterior surfaces of the device 100. The device 100 also includes a display 102 that is configured to display graphical outputs that are visible through a transparent cover 105 overlying the display 102. The transparent cover 105 may also define one or more openings to allow internal components such as microphones, cameras, speakers, sensors, and the like, to have access to the surrounding environment of the device 100. The device 100 may also include a touch sensor that is configured to detect touch events or touch inputs applied to the transparent cover 105. The touch sensor may be integrated with the display or otherwise configured to provide touchscreen functionality.

The device 100 includes a near-field wireless communication system 108 that is configured to wirelessly detect when the electronic device is in proximity to a near-field wireless enabled accessory, such as the case 110. The near-field wireless communication system 108 may be configured for any suitable type or protocol of near-field wireless communications, including but not limited to near-field communications ("NFC") protocols, radio frequency identification ("RFID") protocols, or any other suitable type or protocol. For example, the near-field wireless communication system 108 (and indeed any near-field wireless communication system, antenna, or other component described herein) may be configured to operate in accordance with applicable standards, such as ISO/IEC 14443, FeliCa, ISO/IEC 18092, ISO/IEC 21481, ISO/IEC 13157, or the like.

In some implementations, the near-field wireless communication system 108 includes a wireless antenna (e.g., an antenna configured to transmit and/or receive electromagnetic signals, such as to and/or from a near-field wireless antenna of another object such as a case, a charging accessory (e.g., a charging dock), a wireless terminal (e.g., the wireless terminal 800, FIG. 8A), or the like.

In some cases, the near-field wireless communication system 108 is configured to detect the presence or proximity of passive or un-powered antennas that are incorporated in the accessories. As such, the near-field wireless communication system 108 may be separate from other communication systems in the device 100, such as Bluetooth, WIFI, or cellular communications systems, and may be configured to communicate over a limited range (e.g., the near-field wireless communication system 108 may only detect a near-field wireless antenna when they are within about 10 cm from each other).

In some implementations, instead of or in addition to the near-field wireless communication system 108, the device 100 uses other components and/or techniques to determine how and whether the device 100 is being used with other objects, devices, accessories, or the like. In some implementations, for example, the device 100 uses motion sensors, proximity sensors, ambient light sensors, cameras, magnetic sensors, ultrasonic sensors, or the like to detect events, use conditions, or other aspects of the device 100. For example, such components are used in some implementations to detect when and/or whether the device 100 has been coupled to and/or uncoupled from a case (e.g., the case 110).

The device 100 may also include various additional internal components and structures, such as sensor(s), memory, processor(s), control circuitry, a battery, circuit board (s), a frame or other supporting structure, antenna(s), or the like. The device 100 may also include front- and/or rear-facing camera systems (e.g., a front-facing camera 404, FIG. 4) that can capture images and/or video of external subjects. The camera systems may include lenses, image sensors, focusing and zooming mechanisms, flashes, and any other suitable components.

FIG. 1A also illustrates an example case 110. The case 110 may resemble a sleeve that can receive the device 100 via an opening 111 in the case 110. The case 110 may include a near-field wireless communication antenna 112 (also referred to herein simply as an "antenna") that is detectable by the near-field wireless communication system 108 of the device 100. As used herein, an antenna may be detectable insofar as the antenna or near-field wireless communication circuitry is capable of producing an electrical response when probed or polled by a wireless detection device or circuitry. For example, the antenna may produce a distinct or recognizable disturbance or other response to an electromagnetic field produced by another device or circuit, thereby rendering the antenna detectable. Further, as used herein, a near-field wireless communication antenna being detectable indicates that the near-field wireless communication antenna may be operable to trigger, initiate, or otherwise cause a response in a near-field wireless communication system of a device, where the response indicates that the near-field wireless communication antenna is in the presence and/or proximity of the device (e.g., within a threshold distance).

The antenna 112 may be any suitable type of antenna that is detectable by the near-field wireless communication system 108 of the device 100. For example, in some implementations, the antenna 112 is an NFC antenna, an RFID antenna, or another suitable antenna. In some cases, the antenna 112 is a passive or un-powered antenna. The antenna 112 is positioned in the case so that it is aligned with or otherwise suitably located to be detected by the near-field wireless communication system 108 of the device 100 when the device 100 is inserted into the case 110. In some implementations, the antenna 112 is detectable by the near-field wireless communication system 108 through a back surface of the device 100.

In some implementations, the case 110 covers a portion of the display 102 of the device, while leaving another portion visible through an opening 114 through the case. For example, when the case 110 is coupled to the device 100 (e.g., the device 100 is inside the sleeve case 110), a first region 104 of the display is visible through the opening 114 in the case, and a second region 106 of the display is covered by the case 110. The right-hand side of FIG. 1A shows the device 100 inserted into the case 110. As shown, a graphical object 116 (e.g., a graphical representation of a current time) is displayed in the first region 104 of the display. The particular graphical output that is displayed in the first region 104 of the display when the case 110 is coupled to the device 100 may depend at least in part on a state of the device when the case 110 is coupled to the device 100. In one example, as described herein, if the case 110 is coupled to the device 100 when there is an incoming call to the device 100, the device 100 displays information about the incoming call in the first region 104 of the display (and the information is thus visible through the opening 114).

Figure 1B:
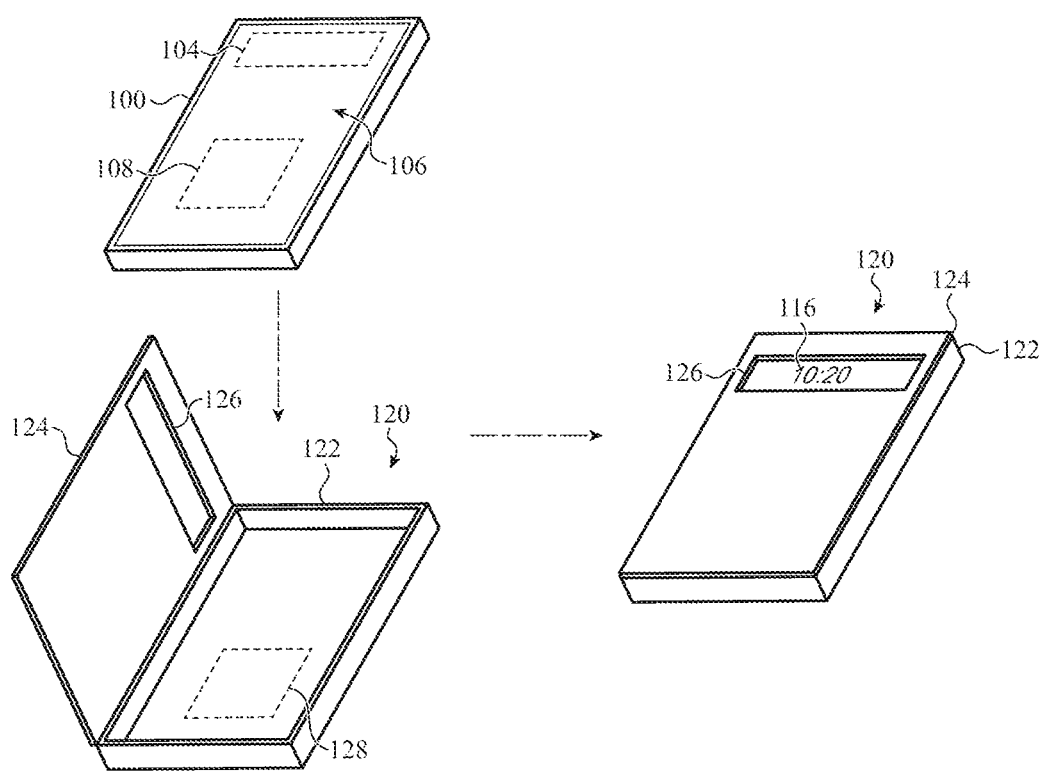
FIG. 1B depicts the example electronic device in use with another example case.

FIG. 1B depicts the device 100 in use with another example case 120. The case 120 may include a near-field wireless communication antenna 128 (also referred to herein simply as an "antenna") that is detectable by the near-field wireless communication system 108 of the device 100. The antenna 128 may be any suitable type of antenna that is detectable by the near-field wireless communication system 108 of the device 100. For example, in some implementations, the antenna 128 is an NFC antenna, an RFID antenna, or another suitable antenna. In some cases, the antenna 128 is a passive or un-powered antenna. The antenna 128 is positioned in the case so that it is aligned with or otherwise suitably located to be detected by the near-field wireless communication system 108 of the device 100 when the device 100 is inserted into the case 120. In some implementations, the antenna 128 is detectable by the near-field wireless communication system 108 through a back surface of the device 100.

Whereas the case 110 resembled a sleeve, and the device 100 is used with the case 110 by inserting the device 100 into the case 110 through an opening 111, the case 120 is a folio-style case that includes a cover 124 that is flexibly coupled (e.g., via a hinge mechanism such as a living hinge) to a main receptacle portion 122. The cover 124 defines an opening 126 through which the first region 104 of the display is visible when the device 100 is coupled to the case 120 (e.g., placed in the main receptacle portion 122) and the front cover 124 is in a closed position.

The right-hand side of FIG. 1B shows the device 100 inserted into the case 120. As shown, the graphical object 116 (e.g., a graphical representation of a current time) is displayed in the first region 104 of the display and is thus visible through the opening 126 in the front cover 124. The particular graphical output that is displayed in the first region 104 of the display when the case 120 is coupled to the device 100 may depend at least in part on a state of the device when the case 120 is coupled to the device 100. In one example, as described herein, if the case 120 is coupled to the device 100 when there is an incoming call to the device 100, the device 100 displays information about the incoming call in the first region 104 of the display (and the information is thus visible through the opening 126).

Figure 1C:
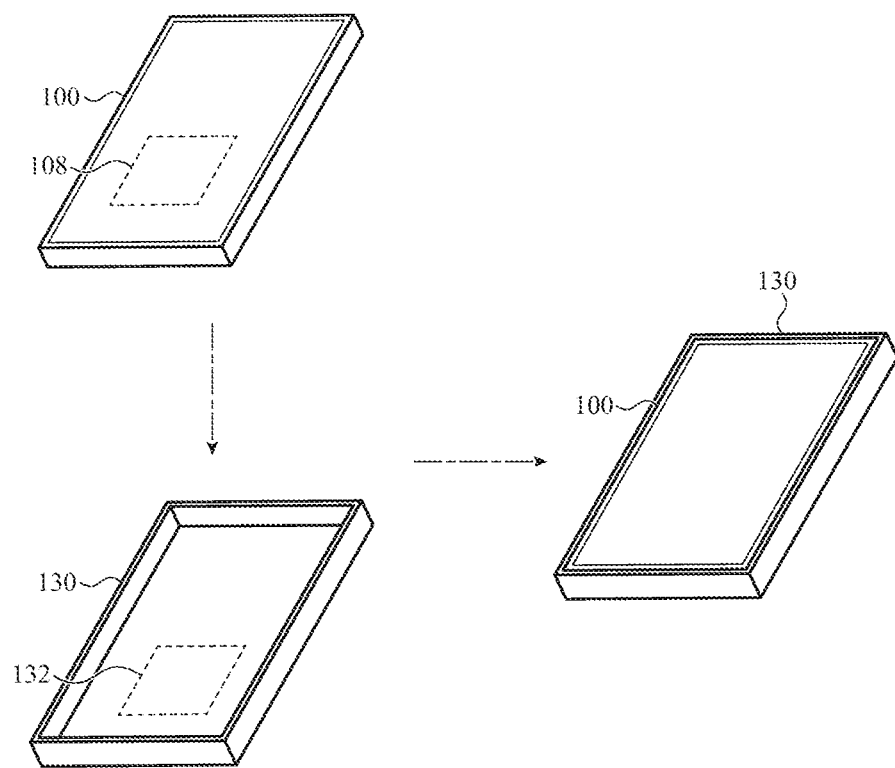
FIG. 1C depicts the example electronic device in use with another example case.

FIG. 1C depicts the device 100 in use with another example case 130. The case 130 resembles a shell-type case that does not cover the display of the device 100. The case 130 may include a near-field wireless communication antenna 132 (also referred to herein simply as an "antenna") that is detectable by the near-field wireless communication system 108 of the device 100. The antenna 132 may be any suitable type of antenna that is detectable by the near-field wireless communication system 108 of the device 100. For example, in some implementations, the antenna 132 is an NFC antenna, an RFID antenna, or another suitable antenna. In some cases, the antenna 132 is a passive or un-powered antenna. The antenna 132 is positioned in the case so that it is aligned with or otherwise suitably located to be detected by the near-field wireless communication system 108 of the device 100 when the device 100 is inserted into the case 130. In some implementations, the antenna 132 is detectable by the near-field wireless communication system 108 through a back surface of the device 100.

As described herein, when a case (e.g., the cases 110, 120, 130) is coupled to the device 100, the device 100 detects the coupling of the case via the near-field wireless communication system 108. The device 100 also detects or receives information about the case, such as a type of case (e.g., whether it is a sleeve case, a folio case, a shell case, etc.), a physical property of the case (e.g., whether or not the case covers the display, a location of an opening in the case (e.g., the openings 114, 126)), a unique identifier of the case, or the like. Based on the information about the case, the device 100 may take different actions in response to events that occur (or are occurring) when the case is coupled to the device 100. For example, in some implementations, if the device 100 detects that it has been coupled to a case that covers part of the display (e.g., the cases 110, 120), and the detection occurs while a call is ongoing and the device is being used in a handset mode, the device 100 terminates the call. By contrast, if the device 100 detects that it has been coupled to a case that does not cover part of the display (e.g., the case 130), and the detection occurs while a call is ongoing and the device is being used in a handset mode, the device 100 does not terminate the call. Other types of operations that may occur in response to detecting a coupling of a case to the device are also described herein.

Figure 2:
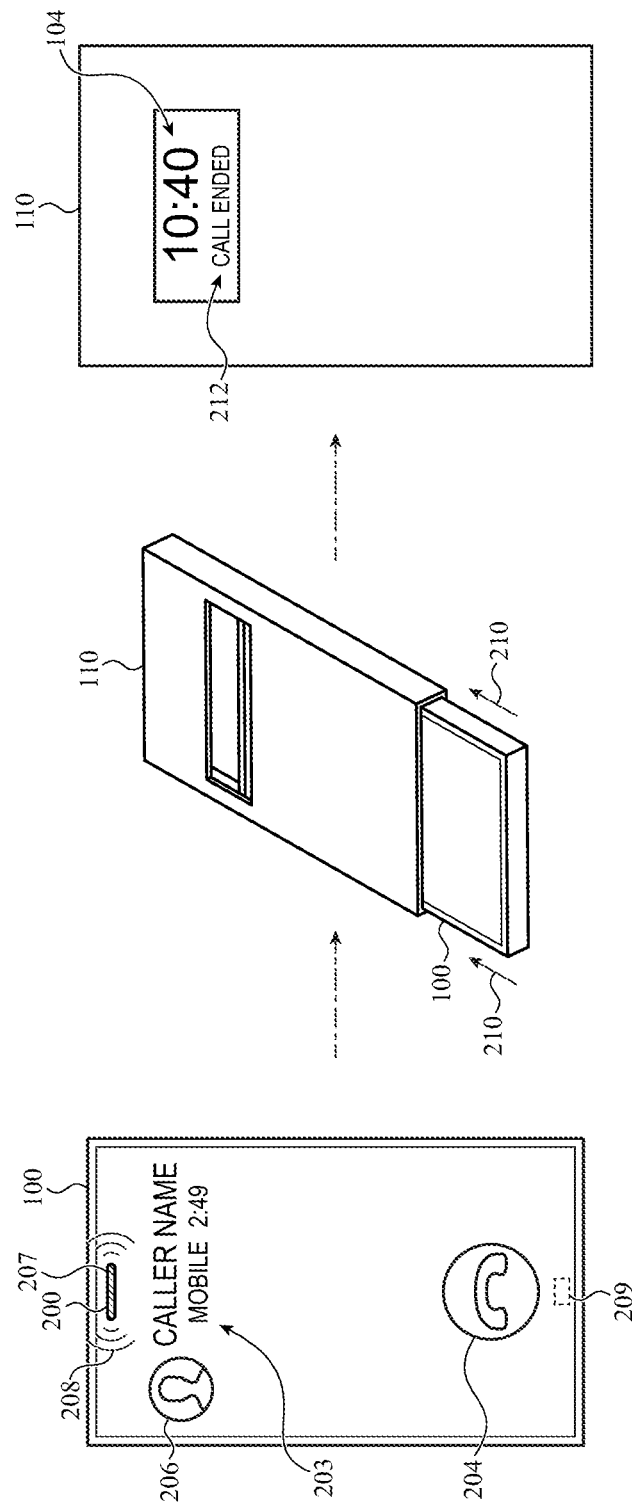
FIG. 2 depicts the example electronic device being coupled to a case while a call is ongoing and the device is in a first audio mode.

FIG. 2 depicts the device 100 being coupled to the case 110 while a call is ongoing between the device 100 and a remote device (e.g., another telephone, a computer, or other communication device). While FIG. 2 (as well as FIGS. 3A-7) show the device 100 being coupled to the case 110, the case 110 shown in these figures represents other cases that include a near-field wireless communication antenna and are configured to cover a portion of the display of a device while leaving another portion visible (e.g., through an opening in the case). For example, the case 110 in FIGS. 2-7 may also represent the case 120 in FIG. 1B.

The device 100 shown on the left-hand side of FIG. 2 depicts the device 100 while a voice call is ongoing, and while the device 100 is operating in a handset mode. The handset mode, which is one of a number of potential audio modes, is a mode in which the device 100 is configured to produce an audio output 208 using an earpiece speaker 200 that is configured to be placed adjacent a user's ear. In some implementations, the transparent cover 105 of the device defines an opening through which the earpiece speaker 200 directs the audio output 208. In some implementations, the audio output 208 from the earpiece speaker 200 has a limited volume range (including a maximum volume limit) that is suitable for use in close proximity to a user's ear (e.g., when the device is physically placed against a user's ear).

In the handset mode, the device 100 receives audio input from a microphone, such as a microphone 209. The microphone 209 is positioned at or proximate a bottom of the device 100 such that it is positioned proximate a user's mouth when the device 100 is being used as a handset (e.g., when the device 100 is placed against a user's head such that the earpiece speaker 200 is adjacent the user's ear). In some implementations, the device 100 includes one or more additional microphones, such as a microphone 207 that receives audio input through the same opening in the transparent cover 105 as the earpiece speaker 200.

In some implementations, while the call is ongoing, the device 100 displays, on the display, a visual indication 203 that includes call information associated with the ongoing call. In some implementations, the information about the call includes a name of the caller, a phone number associated with the caller, a business associated with the caller, a duration of the call, a type of phone or device associated with the caller (or the caller's device), an avatar or image 206 of the caller, and/or other information about or associated with the caller or the call. In some implementations, the device 100 also displays an "end call" affordance 204 (which is a selectable user interface object) which, if touched or otherwise selected by a user, will terminate the ongoing call.

The device 100 may be inserted into (e.g., coupled with) the case 110 while the call is ongoing and while the device 100 is in the handset mode, as indicated by arrows 210. The device 100 detects the coupling of the case 110 to the device 100 via the near-field wireless communication system 108, as described above. In some implementations, in response to detecting the coupling of the case 110 to the device 100, and in accordance with a determination that the computer system is operating in the handset mode (e.g., a particular audio mode), the device 100 terminates the call. In some implementations, after terminating the call, the device 100 displays, in the first region 104 of the display, a visual indication 212 that the call has been terminated (as shown in the right-hand side of FIG. 2, which depicts the device 100 inside the case 110). In some implementations, the visual indication 212 includes text, such as "call ended" or "call terminated." In some implementations, the visual indication 212 includes a duration of the call. In some implementations, information about the terminated call, such as the text indication and the call duration, scroll across the first region 104 of the display.

Figure 3A:
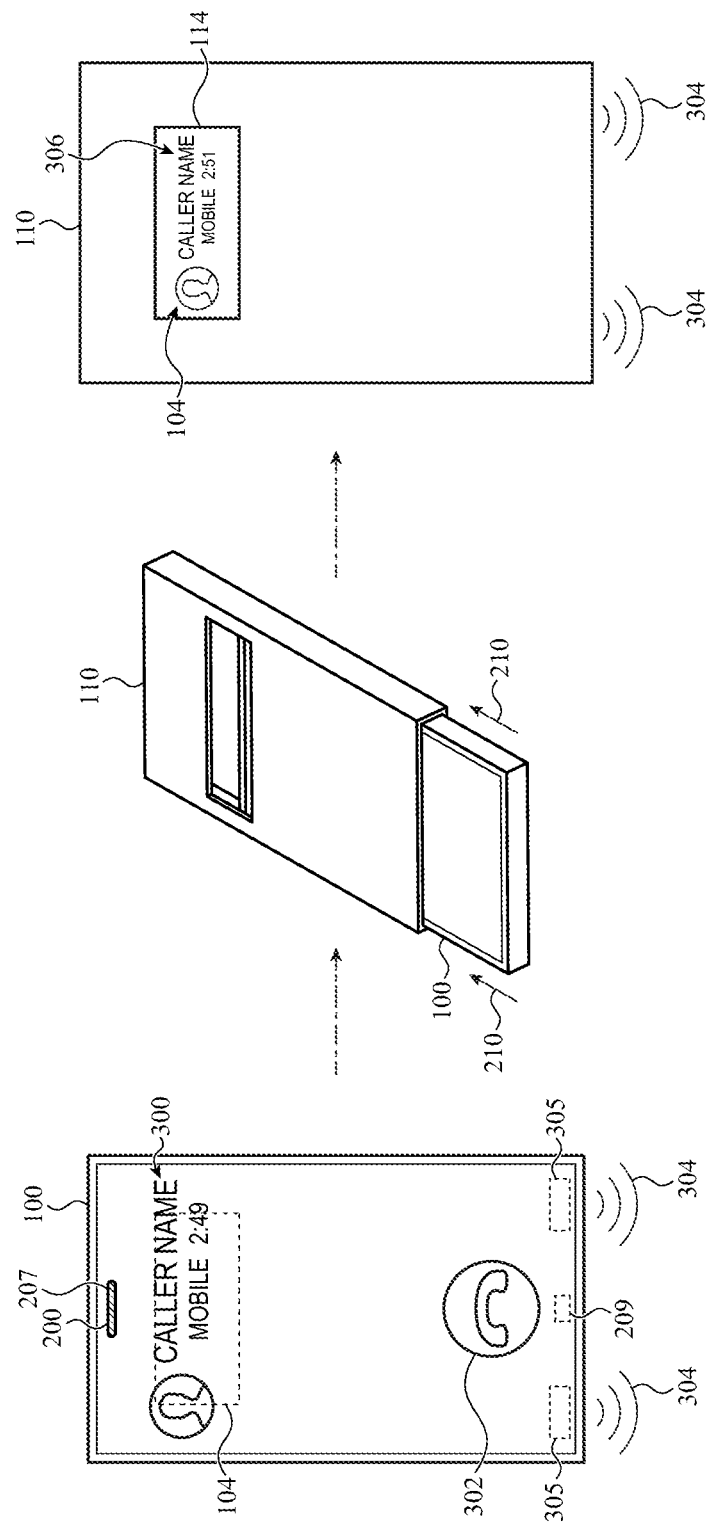
FIG. 3A depicts the example electronic device being coupled to a case while a call is ongoing and the device is in a second audio mode.
Figure 3B:
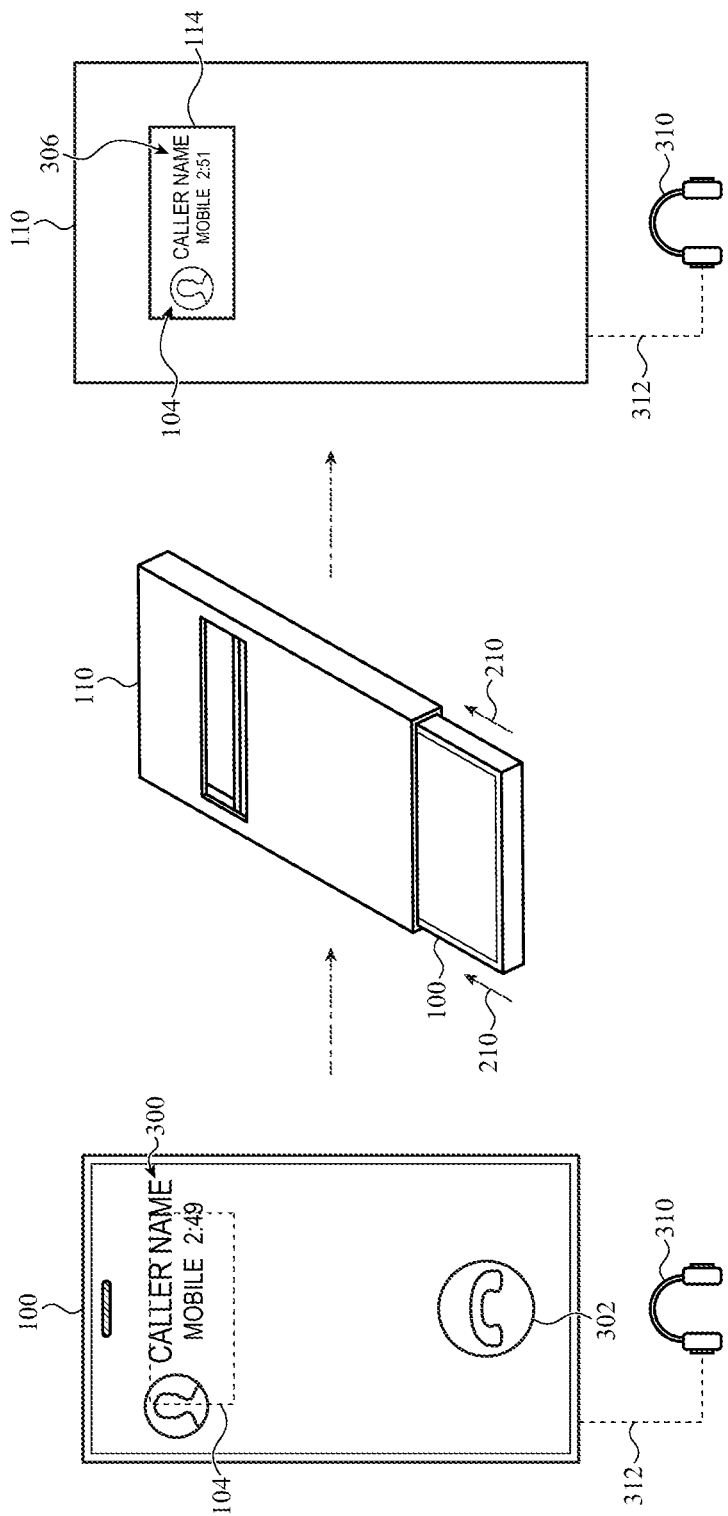
FIG. 3B depicts the example electronic device being coupled to a case while a call is ongoing and the device is in a third audio mode.

FIG. 2 illustrates how the device 100 operates when a call is ongoing when the device 100 detects that it is coupled to a case 110 and the device 100 is operating in a particular audio mode (e.g., a handset mode). More particularly, in such cases, the device 100 terminates the call. FIGS. 3A-3B, on the other hand, illustrate how the device 100 operates when the device 100 detects that it is coupled to the case 110 while a call is ongoing and the device 100 is operating in a different audio mode (e.g., a mode other than a handset mode, such as a speakerphone mode (FIG. 3A) or a remote-audio mode (FIG. 3B)). For example, the device 100 shown on the left-hand side of FIG. 3A depicts the device 100 while a voice call is ongoing, and while the device 100 is operating in a speakerphone mode. The speakerphone mode, which is one of a number of potential audio modes, is a mode in which the device 100 is configured to produce an audio output 304 that is audible to a user when the device 100 is away from the user's ear. For example, in some implementations, the audio output 304 is louder than the audio output of a handset mode (e.g., the audio output 208, FIG. 2). In some implementations, the audio output 304 is produced by one or more speakers 305 of the device 100, which are different than the earpiece speaker 200. In some implementations, the one or more speakers 305 are larger than the earpiece speaker 200, and are configured to output the audio output 304 along a different primary direction than the earpiece speaker 200. In some implementations, the one or more speakers 305 have a less directional output (e.g., a less focused sound) than the earpiece speaker 200. For example, in some implementations, the earpiece speaker 200 is configured to produce a narrower acoustic beam or lobe than the one or more speakers 305.

In the speakerphone mode, the device 100 receives audio input from one or more microphones, such as the microphones 207, 209. In some implementations, the microphone(s) 207, 209 are operated differently when the device 100 is in the speakerphone mode as compared to the handset mode. For example, in some implementations, the device 100 uses both microphones 207, 209 in the speakerphone mode, and uses the microphone 209 but not the microphone 207 in the handset mode. In some implementations, the device 100 uses different audio parameters (e.g., gain) for the microphone(s) in the different audio modes.

The device 100 may be inserted into (e.g., coupled with) the case 110 while the call is ongoing and while the device 100 is in the speakerphone mode, as indicated by arrows 210. The device 100 detects the coupling of the case 110 to the device 100 via the near-field wireless communication system 108, as described above. In some implementations, in response to detecting the coupling of the case 110 to the device 100, and in accordance with a determination that the computer system is operating in the speakerphone mode (e.g., a particular audio mode), the device 100 continues the call (e.g., it does not terminate the call). Accordingly, the device 100 continues to produce the audio output 304 via the speaker(s) 305 and to accept audio inputs (e.g., via the microphone 209) while it is in the case 110.

The difference in how the device 100 operates based on its audio mode may reflect an expectation and/or intention of a user when using the device. For example, when used in a handset mode, placing the device 100 into a case that at least partially covers the screen may be consistent with an intention to terminate the call. As such, the device 100 terminates the call if the audio output mode was a handset mode. On the other hand, when the device is being used in a speakerphone mode (or a remote-audio mode, as described with respect to FIG. 3B), a user may not expect placement of the device 100 into the case 110 to terminate the call. For example, a user may expect that because the case 110 would not interfere with the audio input and/or output functions of the speakerphone mode, the speakerphone call would not be interrupted. As such, the device 100 continues the call when the device 100 is coupled to the case 110.

In some implementations, after the device 100 is coupled to the case 110 (and the call is continued), the device 100 displays, in the first region 104 of the display, a visual indication 306 that includes call information associated with the call. The visual indication 306 provides a visual cue (that is visible through the opening 114 in the case 110) that the call is still ongoing, and provides information about the ongoing call to the user. In some implementations, the information about the call includes a name of the caller, a phone number associated with the caller, a business associated with the caller, a duration of the call, a type of phone or device associated with the caller (or the caller's device), an avatar or image of the caller, and/or other information about or associated with the caller or the call. In some implementations, an "end call" affordance (which is a selectable user interface object) is also displayed in the first region 104 of the display, which, if touched or otherwise selected by a user, will terminate the ongoing call.

In some implementations, prior to detecting the coupling of the case 110 to the device 100 and while the call is ongoing, the device 100 displays, on the display, a visual indication 300 that includes call information associated with the ongoing call. In some implementations, the information about the call includes a name of the caller, a phone number associated with the caller, a business associated with the caller, a duration of the call, a type of phone or device associated with the caller (or the caller's device), an avatar or image of the caller, and/or other information about or associated with the caller or the call. In some implementations, the device 100 also displays an end call affordance 302 which, if touched or otherwise selected by a user, will terminate the ongoing call.

In some implementations, the visual indication 300 is larger than the first region 104 of the display and would be at least partially cut-off by the case 110 when the device 100 is inserted into the case 110. Accordingly, in some implementations, in response to detecting the coupling of the case 110 to the device 100, the visual indication 300 is reduced in size, and the reduced-size visual indication (e.g., the visual indication 306) is displayed in the first region 104 of the display. In some implementations the reduced-size visual indication 306 includes the same content as the larger visual indication 300, but has a reduced size.

While FIG. 3A illustrates how the device 100 operates when the device 100 detects that it is coupled to the case 110 while a call is ongoing and the device 100 is operating in a speakerphone mode, FIG. 3B illustrates how the device 100 operates, according to some implementations, when the device 100 detects that it is coupled to the case 110 while a call is ongoing and the device 100 is operating in a remote-audio mode.

For example, the device 100 shown on the left-hand side of FIG. 3B depicts the device 100 while a voice call is ongoing, and while the device 100 is operating in a remote-audio mode. The remote-audio mode, which is one of a number of potential audio modes, is a mode in which the device 100 is communicatively coupled (e.g., via a connection 312) to a remote speaker system 310 and the device 100 transmits audio associated with the call to the remote speaker system 310.

The remote speaker system 310 includes a speaker (e.g., a loudspeaker) that produces an audio output that is audible to a user. In some implementations, the remote speaker system 310 also includes one or more microphones, and audio inputs (e.g., audio captured by the microphone(s) of the remote speaker system 310) are sent from the remote speaker system 310 to the device 100 via the connection 312.

The remote speaker system 310 is illustrated in FIG. 3B as a set of headphones, though this represents other types of remote speakers as well, such as earbuds, a vehicle audio system, a Bluetooth speaker, a speakerphone accessory, or the like. The connection 312 between the device 100 and the remote speaker system 310 may be a wired connection (e.g., an audio cable physically connected to the device 100 and the remote speaker system 310) or a wireless communication link (e.g., via Bluetooth, WiFi, or any other suitable wireless communication scheme).

The device 100 may be inserted into (e.g., coupled with) the case 110 while the call is ongoing and while the device 100 is in the remote-audio mode, as indicated by arrows 210. The device 100 detects the coupling of the case 110 to the device 100 via the near-field wireless communication system 108, as described above. In some implementations, in response to detecting the coupling of the case 110 to the device 100, and in accordance with a determination that the computer system is operating in the remote-audio mode (e.g., a particular audio mode), the device 100 continues the call (e.g., it does not terminate the call). Accordingly, the device 100 continues to transmit audio associated with the call to the remote speaker system 310.

In some implementations, after the device 100 is coupled to the case 110 (and the call is continued), the device 100 displays, in the first region 104 of the display, a visual indication 306 that includes call information associated with the call. The visual indication 306 provides a visual cue (that is visible through the opening 114 in the case 110) that the call is still ongoing, and provides information about the ongoing call to the user. In some implementations, the information about the call includes a name of the caller, a phone number associated with the caller, a business associated with the caller, a duration of the call, a type of phone or device associated with the caller (or the caller's device), an avatar or image of the caller, and/or other information about or associated with the caller or the call. In some implementations, an "end call" affordance (which is a selectable user interface object) is also displayed in the first region 104 of the display, which, if touched or otherwise selected by a user, will terminate the ongoing call.

In some implementations, prior to detecting the coupling of the case 110 to the device 100 and while the call is ongoing, the device 100 displays, on the display, a visual indication 300 that includes call information associated with the ongoing call. In some implementations, the information about the call includes a name of the caller, a phone number associated with the caller, a business associated with the caller, a duration of the call, a type of phone or device associated with the caller (or the caller's device), an avatar or image of the caller, and/or other information about or associated with the caller or the call. In some implementations, the device 100 also displays an end call affordance 302 which, if touched or otherwise selected by a user, will terminate the ongoing call.

In some implementations, the visual indication 300 is larger than the first region 104 of the display and would be at least partially cut-off by the case 110 when the device 100 is inserted into the case 110. Accordingly, in some implementations, in response to detecting the coupling of the case 110 to the device 100, the visual indication 300 is reduced in size, and the reduced-size visual indication (e.g., the visual indication 306) is displayed in the first region 104 of the display. In some implementations the reduced-size visual indication 306 includes the same content as the larger visual indication 300, but has a reduced size.

Figure 4:
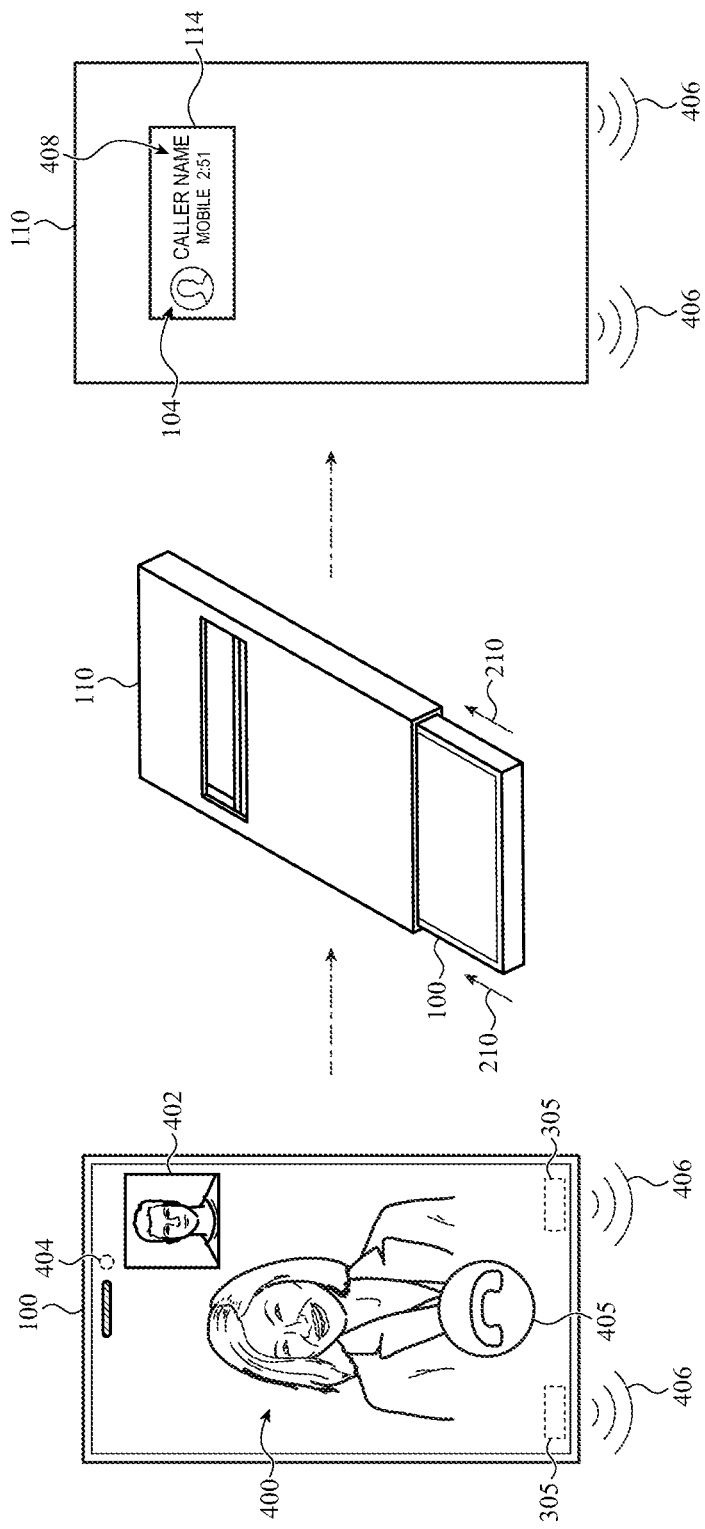
FIG. 4 depicts the example electronic device being coupled to a case while a video call is ongoing.

FIG. 4 illustrates how the device 100 may operate, according to some implementations, when the device 100 detects that it is coupled to the case 110 while a video call is ongoing. For example, the device 100 shown on the left-hand side of FIG. 4 depicts the device 100 while a video call is ongoing and the device is outputting, via at least one of a speaker of the device (e.g., the speaker(s) 305, as shown), or a remote speaker communicatively coupled to the device (e.g., remote speaker system 310), audio content associated with the call (e.g., audio output 406).

Because the ongoing call is a video call, the device 100 is also displaying, on the display of the device, video content 400 associated with the call. In some implementations, the video content 400 includes a video feed from the remote device that is participating in the call. In some implementations, the device 100 also displays a video preview 402 of the user of the device 100. The video preview 402 may be captured by a camera 404 of the device 100.

The device 100 may be inserted into (e.g., coupled with) the case 110 while the video call is ongoing and while the device 100 is in the speakerphone mode, as indicated by arrows 210. The device 100 detects the coupling of the case 110 to the device 100 via the near-field wireless communication system 108, as described above. In some implementations, in response to detecting the coupling of the case 110 to the device 100, and in accordance with a determination that the computer system is operating in an audio mode other than a handset mode (e.g., the speakerphone mode or the remote-audio mode), the device 100 continues to output audio content associated with the call (e.g., via the speaker(s) 305 or a remote speaker system), but ceases display of the video content 400. Accordingly, the device 100 continues to produce the audio output 406 via the speaker(s) 305 and to accept audio inputs while it is in the case 110. The display of video content 400 may be ceased because the case covers at least a portion of the display, such that the video content would not be visible, and may also cover the camera 404, such that the video feed of the user of the device 100 would no longer be captured.

In some implementations, after the device 100 is coupled to the case 110 (and the call is continued in an audio-only mode), the device 100 displays, in the first region 104 of the display, a visual indication 408 that includes call information associated with the call. The visual indication 408 provides a visual cue (that is visible through the opening 114 in the case 110) that the call is still ongoing, and provides information about the ongoing call to the user. In some implementations, the information about the call includes a name of the caller, a phone number associated with the caller, a business associated with the caller, a duration of the call, a type of phone or device associated with the caller (or the caller's device), an avatar or image of the caller, and/or other information about or associated with the caller or the call. In some implementations, an "end call" affordance (which is a selectable user interface object) is also displayed in the first region 104 of the display, which, if touched or otherwise selected by a user, will terminate the ongoing call.

In some implementations, prior to detecting the coupling of the case 110 to the device 100 and while the video call is ongoing, the device 100 displays, on the display, an end call affordance 405 which, if touched or otherwise selected by a user, will terminate the ongoing call.

In some cases, the device 100 may be coupled to a case when there are multiple ongoing calls at the device 100 and the device 100 is in a non-handset audio mode (e.g. a speakerphone or remote-speaker mode). For example, the device 100 may be part of a multi-party call in which the device 100 is in communication with two remote devices.

Figure 5:
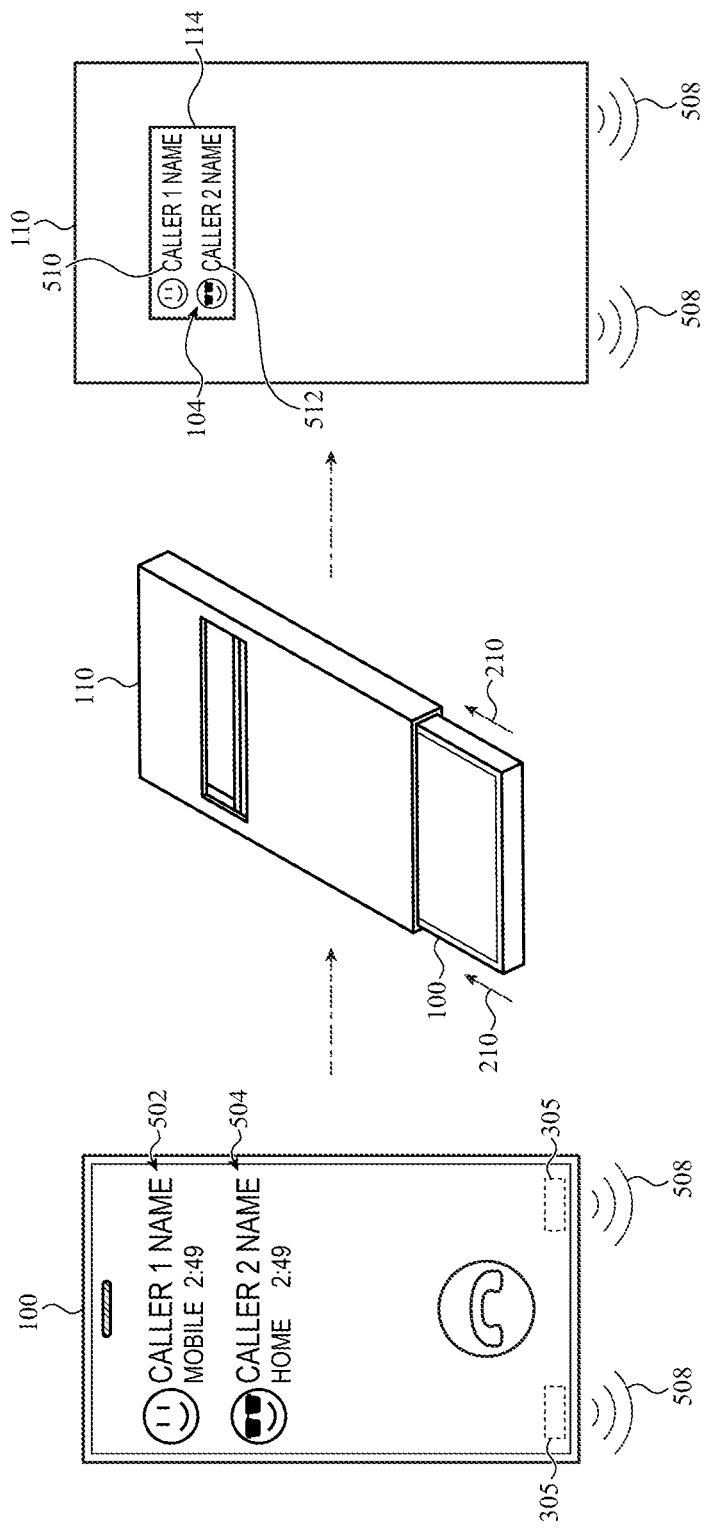
FIG. 5 depicts the example electronic device being coupled to a case while a multi-party call is ongoing.

FIG. 5 shows the device 100 engaged in a multi-party call and operating in a speakerphone mode (e.g., the device 100 is producing an audio output 508 from speaker(s) 305 of the device 100). The device 100 is also displaying first call information 502 associated with a first call of the multi-party call, and second call information 504 associated with a second call of the multi-party call. In some implementations, the first and second call information 502, 504 includes a name of the caller, a phone number associated with the caller, a business associated with the caller, a duration of the call, a type of phone or device associated with the caller (or the caller's device), an avatar or image of the caller, and/or other information about or associated with the caller or the call.

In some implementations, after the device 100 is coupled to the case 110 (and the call is continued), the device 100 displays, in the first region 104 of the display, first call information 510 associated with the first call and second call information 512 associated with the second call. The first and second call information 510, 512 (displayed after the case 110 is coupled to the device 100) may include all or some of the information shown in the first and second call information 502, 504 (displayed before the case 110 is coupled to the device 100).

In some implementations, the first and second call information 502, 504 displayed before the case 110 is coupled to the device 100 are larger than the first region 104 of the display and would be at least partially cut-off by the case 110 when the device 100 is inserted into the case 110. Accordingly, in some implementations, in response to detecting the coupling of the case 110 to the device 100, the first and second call information 502, 504 are reduced in size, and reduced-size call information (e.g., the first and second call information 510, 512) is displayed in the first region 104 of the display. In some implementations the reduced-size call information includes the same content as the larger call information, but has a reduced size.

FIGS. 2-5 illustrate how the device 100 operates when the device 100 is coupled to certain types of cases while a call is ongoing, according to some implementations. In some implementations, the device operates differently when it is attached to a different type of case. The ability to perform different actions based on the different types of cases is enabled by the near-field wireless communications systems of the device and the cases. In particular, as described above, the device 100 receives, from the near-field wireless communication antenna of a case, information about that particular case (e.g., whether the case covers at least part of the display), and takes a particular action based on the type of case that is detected. For example, in some implementations, the operations described with respect to FIGS. 2-5 occur when the device 100 is attached to a case that at least partially covers the display of the case (e.g., the cases 110, 120). In some implementations, in response to detecting the coupling of a different type of case (e.g., a case that does not cover the display, such as the case 130 in FIG. 1C), the device 100 continues an ongoing call regardless of whether the system is operating in a first audio mode (e.g., a handset mode) or a second audio mode (e.g., a hands-free mode such as a speakerphone mode or a remote-audio mode).

Figure 6A:
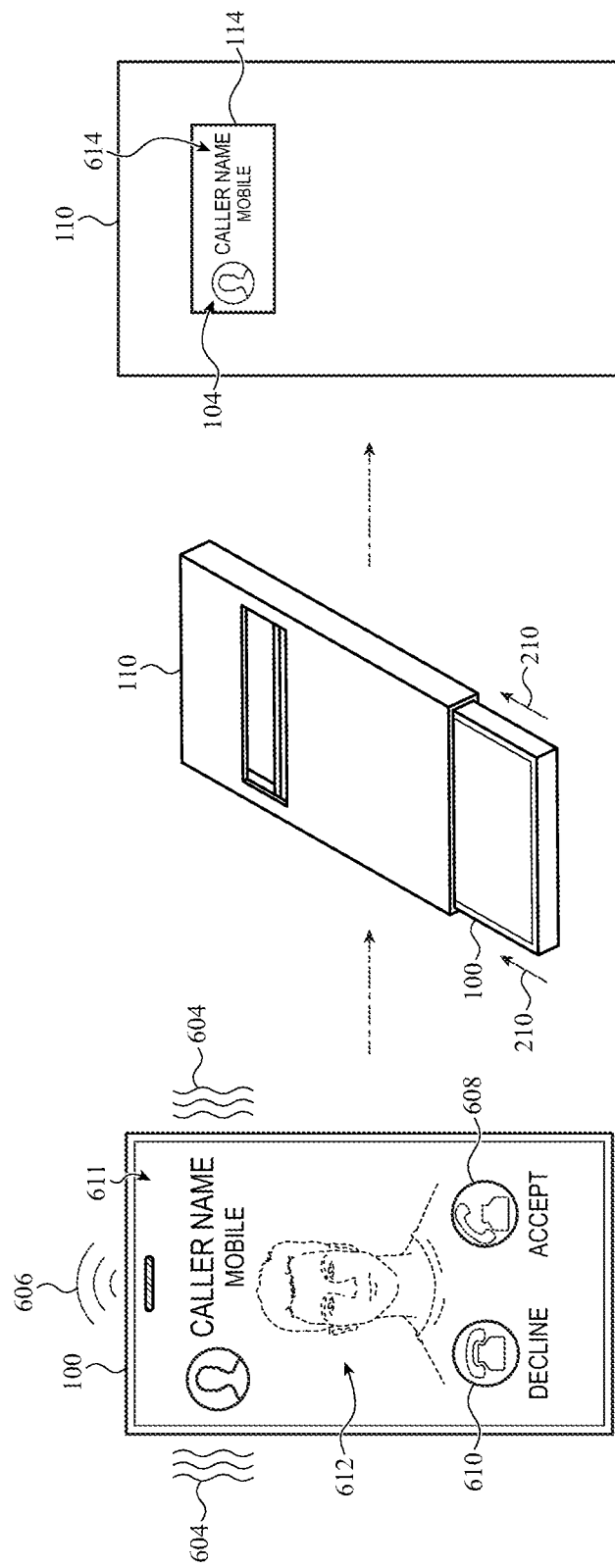
FIGS. 6A-6B depict the example electronic device being coupled to a case while an incoming call alert is active.
Figure 6B:
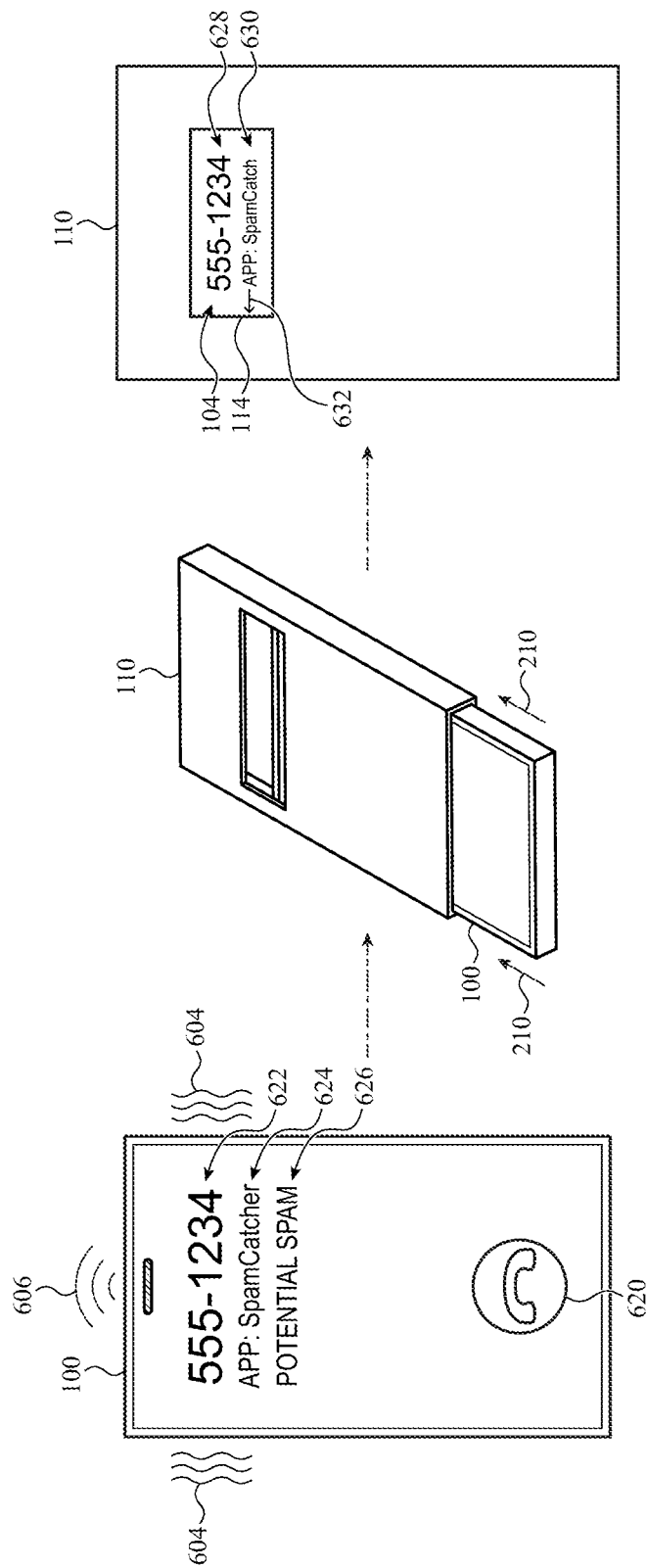

FIGS. 2-5 illustrate example operations of the device 100 when the device 100 is coupled to a case while a call is ongoing. FIGS. 6A-6B illustrate example operations of the device 100 when the device 100 is coupled to a case while there is an active incoming call to the device 100.

FIG. 6A, for example, shows the device 100 while an incoming call is active. The incoming call may be an audio call or a video call. In response to detecting the incoming call, the device 100 outputs an incoming call alert, wherein outputting the incoming call alert includes generating an audible output 606 and/or generating a haptic output 604. In some implementations, the audible output 606 is generated via an audio output generator such as a speaker (e.g., the speaker(s) 200, 305) of the device. In some implementations, the audible output 606 is a ringtone, a beep, a melody, a song, a voice alert, or the like.

In some implementations, the haptic output 604 includes a vibration, impulse, or the like. In some implementations, the haptic output 604 is generated via a haptic output generator of the device 100, such a linear or rotating motor that moves and/or oscillates a mass.

In some implementations, outputting the incoming call alert includes displaying, on the display, a visual indication 611 including information about the incoming call. In some implementations, the information about the call includes a name of the caller, a phone number associated with the caller, a business associated with the caller, a duration of the call, a type of phone or device associated with the caller (or the caller's device), an avatar or image of the caller, and/or other information about or associated with the caller or the call. In some implementations, the device 100 also displays an "accept call" affordance 608 (which is a selectable user interface object) which, if touched or otherwise selected by a user, will cause the device 100 to accept the incoming call. In some implementations, the device 100 also displays a "decline call" affordance 610 (which is a selectable user interface object) which, if touched or otherwise selected by a user, will cause the device 100 to decline the incoming call.

In some implementations, if the incoming call is a video call, the device 100 also displays, in response to detecting the incoming call, a video preview 612 of the user of the device 100 (e.g., as captured by the camera 404 of the device, FIG. 4). The video preview 612 allows the user to preview what the incoming caller would see if the user were to accept the incoming video call.

The device 100 may be inserted into (e.g., coupled with) the case 110 while the incoming call alert is active, as indicated by arrows 210. The device 100 detects the coupling of the case 110 to the device 100 via the near-field wireless communication system 108, as described above. In some implementations, in response to detecting the coupling of the case to the device 100 while the incoming call alert is active, the device 100 ceases to produce the at least one of the audible output 606 or the haptic output 604. In some implementations, the device 100 ceases to produce the haptic output 604 but continues to produce the audible output 606, while in other implementations the device 100 ceases to produce the audible output 606 but continues to produce the haptic output 604. In yet other implementations, the device 100 ceases both the haptic output 604 and the audible output 606. In some implementations, both the audio and haptic output continue, but the audio and/or haptic output are decreased in amplitude. In some implementations, both the audio and haptic output continue but the audio and/or haptic output are increased in amplitude.

In some implementations, in response to detecting the coupling of the case 110 to the device 100 while the incoming call alert is active, the device 100 ceases to produce the at least one of the audible output 606 or the haptic output 604 without declining the incoming call. In such cases, the user can still accept the call, such as by removing the device 100 from the case while the call is still incoming and by touching the "accept call" affordance 608. As another example, the user can still accept the call while the device 100 is in the case 110 via another device that is in communication with the device 100. For example, in some implementations, the user can accept the call by providing an input via headphones or earbuds that are communicatively coupled to the device 100 (e.g., via wired or wireless connection). In some implementations, the user can accept the call via a watch, laptop computer, or other device. If the call is accepted while the device 100 is in the case 110, the device may default to a non-handset audio mode, such as a speakerphone mode, a remote-speaker mode, or the like.

In some implementations, after the device 100 is coupled to the case 110 and the at least one of the audible output 606 or the haptic output 604 were ceased without declining the incoming call, the device 100 displays, in the first region 104 of the display, a visual indication 614 that includes call information associated with the call. The visual indication 614 provides a visual cue (that is visible through the opening 114 in the case 110) that the call is still incoming (e.g., it has not been declined), and provides information about the incoming call to the user. In some implementations, the information about the incoming call includes a name of the caller, a phone number associated with the caller, a business associated with the caller, a duration of the call, a type of phone or device associated with the caller (or the caller's device), an avatar or image of the caller, and/or other information about or associated with the caller or the call. In some implementations, an "accept call" affordance and/or a "decline call" affordance is also displayed in the first region 104 of the display, which, if touched or otherwise selected by a user, will accept or decline the incoming call, respectively.

In some implementations, the visual indication 614 is a reduced-size version of the visual indication 611. In some implementations, the reduced-size visual indication 614 includes the same content as the larger visual indication 611, but has a reduced size.

In some cases, a visual indication that is displayed in response to detecting an incoming call includes more information than can be depicted in the first region 104 of a display when the device 100 is coupled to a case. For example, FIG. 6B illustrates the device 100 while an incoming call is active. As described with respect to FIG. 6A, in response to detecting the incoming call, the device 100 outputs an incoming call alert, wherein outputting the incoming call alert includes generating an audible output 606 and/or generating a haptic output 604. The device 100 also displays a visual indication that includes first information 622, second information 624, and third information 626. The first, second, and third information 622, 624, 626 may be any suitable types of information. In some implementations, as shown in FIG. 6B, the first information 622 corresponds to a phone number of the incoming caller, the second information 624 corresponds to an indication of an application on the device that has screened the incoming caller to determine if it is a spam call (e.g., an application titled "SpamCatch"), and the third information 626 corresponds to a textual notification that the incoming call may be a spam call. As shown, the visual indication includes three separate lines or rows containing information. The device 100 may also display an "end call" affordance 620, which may cause the incoming call to be declined if selected.

The device 100 may be inserted into (e.g., coupled with) the case 110 while the incoming call alert is active, as indicated by arrows 210. The device 100 detects the coupling of the case 110 to the device 100 via the near-field wireless communication system 108, as described above. In some implementations, if the visual indication that was displayed when the device 100 was not coupled to the case includes more information than can be effectively displayed in the first region 104, the device 100 displays a condensed version of the information. In some implementations, as shown in the right-hand side of FIG. 6B, the device 100 displays two rows of information, instead of the three rows initially displayed. A first row of information 628 includes the first information (e.g., the phone number of the incoming caller), and the second row of information 630 includes the second information (e.g., the indication of the application that has screened the call) and the third information (e.g., the indication that the call is potentially spam). In order to fit both the second and third information 624, 626 in the second row, the text (and/or associated graphics) of the second and third information 624, 626 may scroll horizontally across the first region 104 of the display, as indicated by arrow 632. In this way, the same information is provided in a smaller display area, while also providing the information at a reasonable size. In some implementations, all of the information is displayed in a single row, and the text (and/or associated graphics) are scrolled horizontally across the single row.

Figure 7:
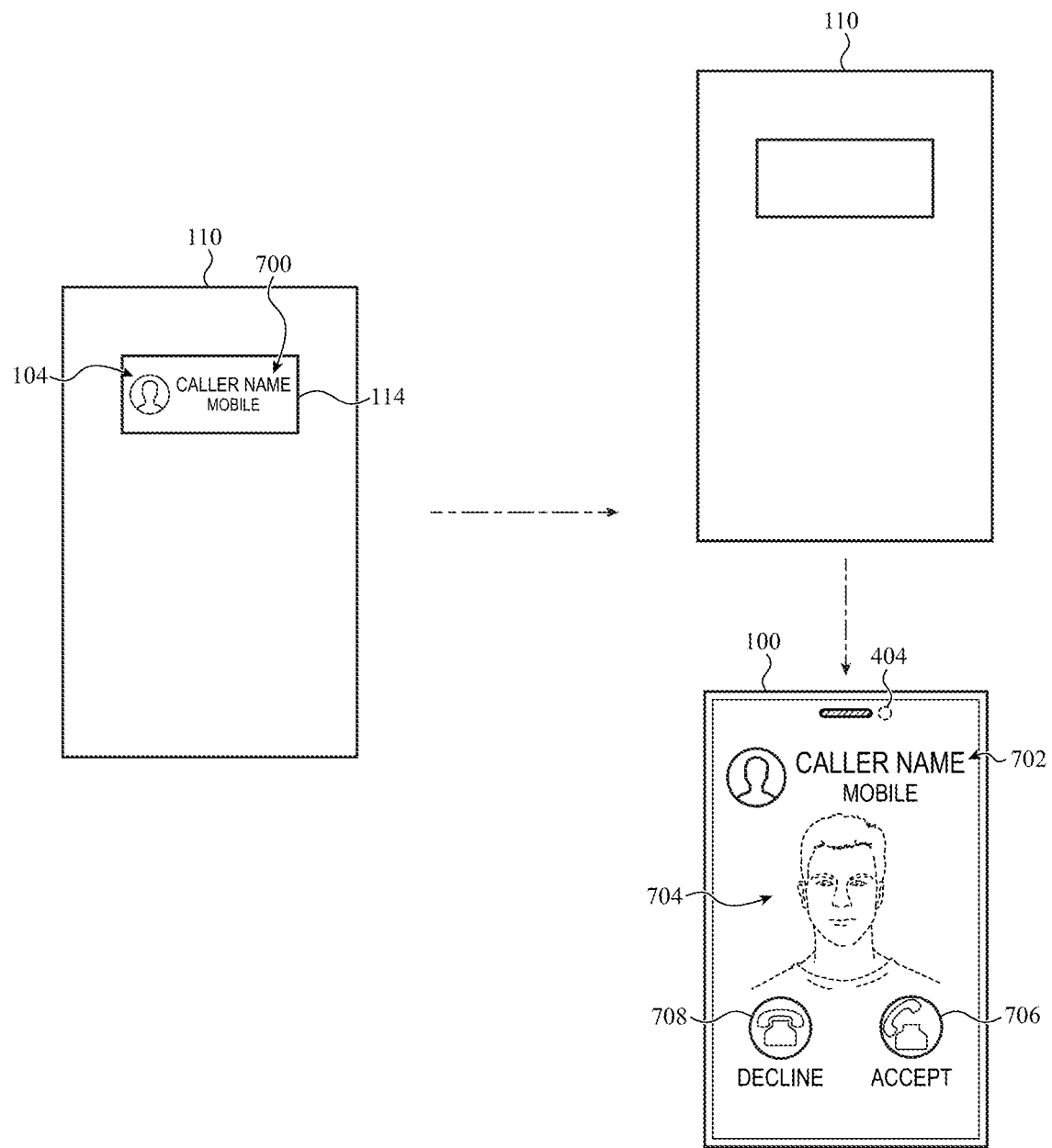
FIG. 7 depicts the example electronic device being removed from a case while an incoming call is active.

As noted above, if, while a call is incoming, the device 100 is coupled to a case that covers all or part of the display, the device 100 may cease producing an audible output and/or a haptic output of an incoming call alert without declining the call. FIG. 7 illustrates how a user may accept the incoming call after the device 100 has been coupled to the case 110 while the call was incoming. In particular, as shown in the left-hand side of FIG. 7, the device 100 is coupled to (e.g., inside) the case 110, and the device 100 is displaying a visual indication 700 in the first region 104 of the display, where the visual indication 700 includes information about the incoming call.

In response to the device 100 detecting that it has been removed from (e.g., decoupled from) the case 110 (e.g., with the near-field wireless communication systems), the device 100 displays a visual indication 702 including information about the incoming call. The visual indication 702 may be an increased-size version of the visual indication 700. In some implementations, the device 100 also displays an "accept call" affordance 706 (which is a selectable user interface object) which, if touched or otherwise selected by a user, will cause the device 100 to accept the incoming call. In some implementations, the device 100 also displays a "decline call" affordance 708 (which is a selectable user interface object) which, if touched or otherwise selected by a user, will cause the device 100 to decline the incoming call.

In some implementations, if the incoming call is a video call, the device 100 displays, in response to detecting the incoming call, a video preview 704 of the user of the device 100 (e.g., as captured by the camera 404 of the device). The video preview 704 allows the user to preview what the incoming caller would see if the user were to accept the incoming video call.

After the device 100 has been at least partially removed from the case, a user may accept the call (e.g., by selecting the "accept call" affordance 706), decline the call (e.g., by selecting the "decline call" affordance 708), or return the device 100 into the case 110.

FIG. 7 also illustrates an example operation of the device if an incoming call is detected while the device 100 is in the case 110. In particular, in some implementations, in response to detecting the incoming call while the device 100 is in the case 110, the device 100 displays a visual indication 700 in the first region 104 of the display, where the visual indication 700 includes information about the incoming call. In some implementations, the device 100 also outputs an incoming call alert, wherein outputting the incoming call alert includes generating an audible output and/or generating a haptic output. In other implementations, the device 100 does not produce an audible or haptic output in response to detecting the incoming call when the device 100 is coupled to the case 110.

In response to the device 100 detecting that it has been removed from (e.g., decoupled from) the case 110 while the incoming call is still incoming, the device 100 displays graphical content as described above. For example, in some implementations, the device 100 displays a visual indication 702 including information about the incoming call, an "accept call" affordance 706, and a "decline call" affordance 708. Further, as noted above, if the incoming call is a video call, the device 100 may display, in response to detecting the incoming call, a video preview 704 of the user of the device 100 (e.g., as captured by the camera 404 of the device).

In some implementations, when the device 100 is coupled to the case 110, 120 (or another case that at least partially covers the display), the device 100 may transition from a first authorization level (e.g., an unlocked state) to a second authorization level (e.g., a locked state). Thus, for example, if the device 100 is in an unlocked state when it is coupled with the case 110, the device 100 will become locked. Once the device is in a state corresponding to the second authorization level (e.g., a locked state), the user can transition the device to the first authorization level (e.g., the unlocked state) via an authentication process (e.g., a password, a biometric authentication, or the like). In some implementations, device functions and/or data that are available when the device is in a second state corresponding to a second authorization level (e.g., a locked state) may be limited. For example, personally identifiable information or applications that may access personally identifiable information may be inaccessible, and functions such as telephone calls (to non-emergency numbers), text messages, emails, or the like may be deactivated.

In some implementations, the device transitions from the unlocked to the locked state when coupled to a certain type of case regardless of a call status when the device is coupled to the case. For example, in some implementations, the device transitions from the unlocked to the locked state (when coupled to a case that at least partially covers the display) even if there is an incoming call or an ongoing call.

In some implementations, the device 100 provides various functions using its near-field wireless communications system 108. For example, in some implementations, the device 100 may be placed in proximity to (e.g., within about 10 centimeters) a wireless terminal to facilitate wireless interaction between the device 100 and the terminal. In some implementations, the wireless interaction includes the device 100 providing a secure credential to the terminal. The secure credential may correspond to or be associated with or otherwise represent credit cards, debit cards, boarding passes, transit passes, loyalty cards, identification cards, secure area access cards, and the like. Accordingly, the wireless interaction between the device 100 and the wireless terminal may be used to facilitate wireless payments, to facilitate user-identification and/or authorization to access facilities and/or services (e.g., to get on a plane or a train, to enter a building, to enter or start a vehicle), or the like.

FIGS. 8A-8D illustrate the device 100, which is coupled to the case 110, being used to wirelessly provide a secure credential (and/or information corresponding to the secure credential) to a wireless terminal. The secure credential may correspond to a boarding pass, credit card, debit card, transit pass, loyalty card, identification card, secure area access card, or the like. In some implementations, the secure credential is associated with a credential management application on the device that manages a plurality of secure credentials that are available for use in different situations (e.g., the credential management application may manage one or more boarding passes, credit cards, debit cards, transit passes, loyalty cards, identification cards, secure area access cards, and the like).

At stage 802, the device 100 is in the case 110 and has not yet initiated communication with a wireless terminal 800. At stage 804, the device 100 is brought into proximity of the wireless terminal 800 (e.g., within about 10 cm). The device 100 detects, via a wireless antenna (e.g., associated with the near-field wireless communications system 108) the presence of the wireless terminal 800. In some implementations, detecting the presence of the wireless terminal 800 includes detecting a wireless signal from the wireless terminal 800 that meets proximity criteria, such as a wireless signal strength criteria or a distance proximity criteria that indicates that the computer system has been intentionally moved close to the wireless terminal as an indication of user intent to provide one or more secure credentials to the wireless terminal 800. In some embodiments, the wireless terminal 800 is optionally one of a wireless authentication terminal, a wireless payment terminal, or a wireless credential terminal.

In response to detecting the presence of the wireless terminal 800 (e.g., via a wireless signal from the wireless terminal that meets the proximity criteria) that is associated with a respective type of secure credential (e.g., one or more boarding passes, credit cards, debit cards, transit passes, loyalty cards, identification cards, secure area access cards, and the like), the device 100 determines if it is able to provide information corresponding to the secure credential to the wireless terminal 800. In some embodiments, to secure the transfer of a secure credential (and/or information corresponding to the secure credential) from the device 100 to the wireless terminal 800, a device account number (that optionally can only be decrypted with user authorization) is stored in a secure element (also referred to as a secure processing element) of the device 100 (as described with respect to FIG. 13). The device account number is isolated from the operating system of the device 100 and is not backed up during backup processes. After the computer system receives authorization (e.g., via authentication, via biometric authentication (face recognition, fingerprint recognition) to perform the transfer to the wireless terminal 800 (e.g., use the account in the transaction), the secure element provides (e.g., transmits, wirelessly) a device account number and a transaction-specific dynamic security code to the wireless terminal 800 along with additional information needed to complete the transfer. In some embodiments, the computer system does not send the actual secure credential (e.g., the actual payment card number, boarding pass identifier, loyalty number, account number, or whatever specific data is associated with or corresponds to a secure credential). Accordingly, the transfer of the secure credential (and/or the information corresponding to the secure credential) to the wireless terminal 800 is a secure transfer.

In some implementations, while the device 100 is determining whether or not it is able to provide information corresponding to the secure credential to the wireless terminal 800, the device 100 displays (at stage 806) a first visual indication 805 in the first region 104 of the display. In some implementations, the first visual indication 805 includes a first graphical object 826 that represents the secure credential of the type that is associated with the wireless terminal 800. Thus, for example, if the wireless terminal 800 is a payment terminal associated with a payment credential, the first graphical object 826 represents a payment card (e.g., a credit card, debit card, gift card, or the like). As another example, if the wireless terminal 800 is configured to authorize access to a transit system and is associated with a transit credential, the first graphical object 826 is a representation of a transit card or transit token/ticket. In some implementations, the first graphical object 826 has an appearance that mimics or represents a physical card, ticket, token, or the like. Thus, in some implementations, the first graphical object 826 looks like a credit card when the wireless terminal 800 is a payment terminal, or a boarding pass when the wireless terminal 800 is an airline-access terminal.

In some implementations, the visual indication 805 also includes a status indicator graphic 808. In some implementations, the status indicator graphic 808 includes an animation, while in other implementations it is a static (e.g., non-animated) graphic. The status indicator graphic 808 indicates to the user that the device is in the process of determining whether or not the device 100 is able to provide information corresponding to the secure credential to the wireless terminal 800, and/or is in the process of providing the information to the wireless terminal 800.

The device 100 determines whether or not the information corresponding to the secure credential can be provided to the wireless terminal 800, and takes an action (including displaying a particular prompt or visual indication) based on the result of the determination. For example, if a criteria that the device 100 is not able to provide the information corresponding to the secure credential to the wireless terminal 800 is met (e.g., the device detects that it cannot provide the information to the wireless terminal 800), indicated as option A in FIG. 8A, the device 100 displays a visual indication and/or prompt for the user to take additional steps to rectify the issue. If the criteria is not met (e.g., the device 100 is able to provide the information corresponding to the secure credential to the wireless terminal 800), indicated as option B in FIG. 8A, the device provides the information to the terminal 800 and displays a visual indication and/or prompt indicating the information was successfully provided to the terminal 800.

Figure 8A:
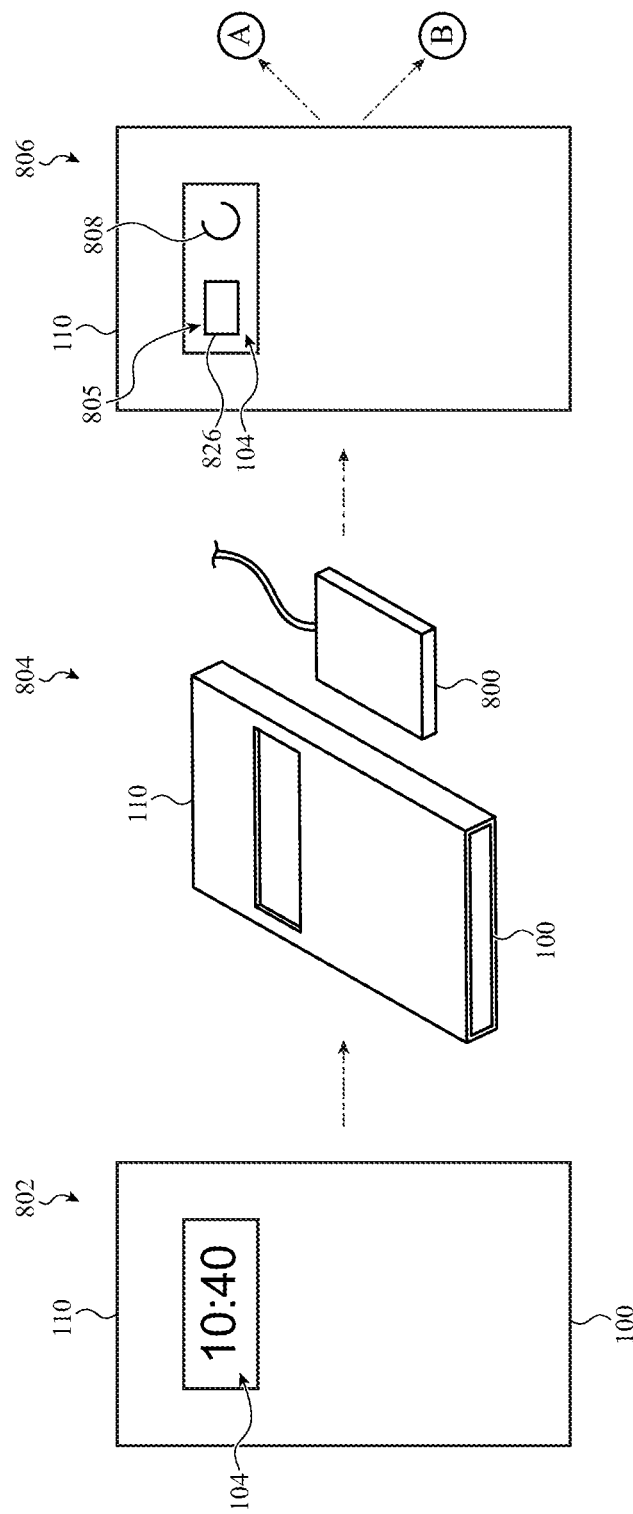
FIGS. 8A-8D depict the example electronic device being used to provide information corresponding to secure credentials to a wireless terminal.
Figure 8B:
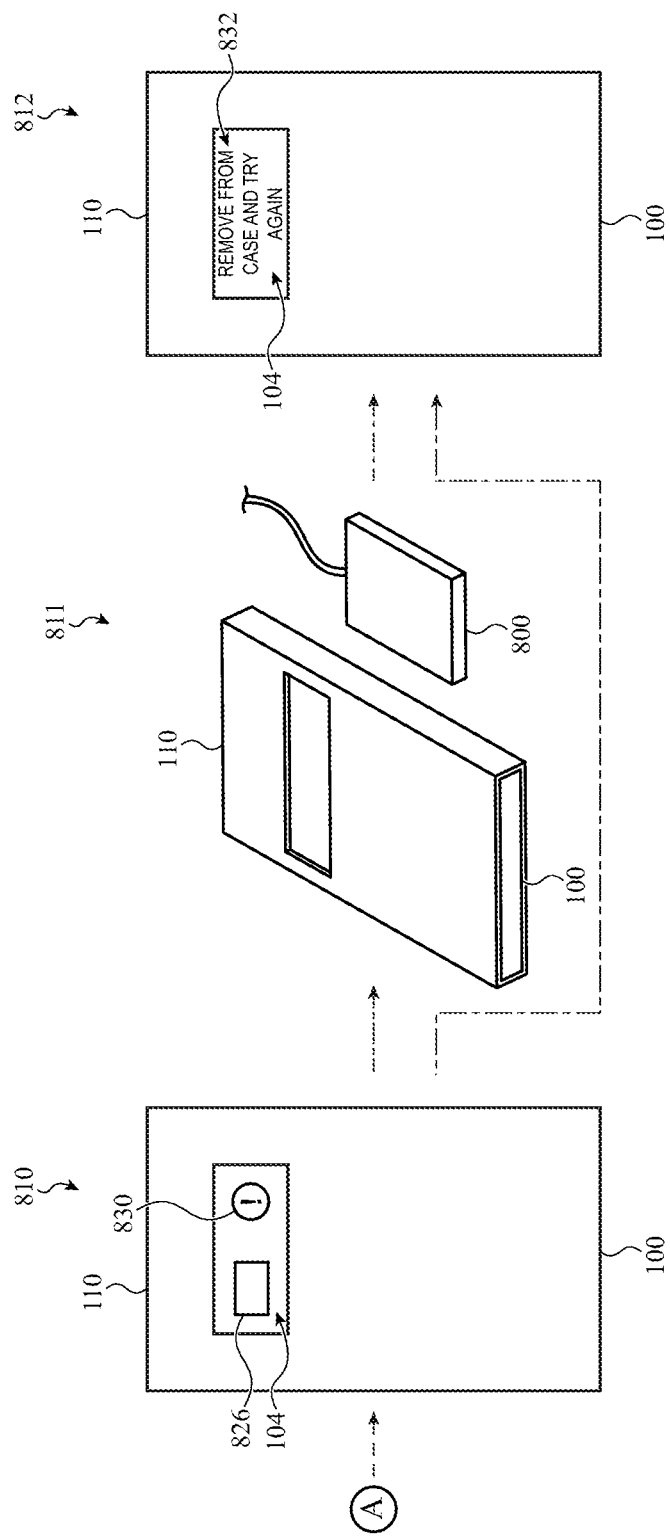

FIG. 8B illustrates the device 100 (coupled to the case 110) after determining that the device 100 is not able to provide the information corresponding to the secure credential. In some implementations, a determination that the device 100 is not able to (or fails to) provide the information corresponding to the secure credential is at least one part of the criteria for displaying a prompt to uncouple the device 100 from the case 110. More particularly, in some implementations, a determination that the device 100 is not able to (or fails to) provide the information corresponding to the secure credential is the only criteria for displaying a prompt to uncouple the device 100 from the case 110, while in other implementations the criteria include additional factors (e.g., two attempts must be made to provide the secure credential before the prompt is displayed).

In some implementations, prior to displaying the prompt to uncouple the device 100 from the case 110 (which is shown at stage 812), the device 100 optionally displays an error condition indication 830 in the first region 104 of the display (shown at stage 810). The error condition indication 830 indicates to the user that the provision of the information corresponding to the secure credential has not occurred.

In some implementations, after displaying the error condition indication 830 (e.g., for a predetermined time (e.g., about 2 seconds, about 3 seconds, about 4 seconds), the device 100 displays, in the first region 104 of the display, a prompt 832 to uncouple the device 100 from the case 110. Upon uncoupling the device 100 from the case 110, the user can reattempt to initiate the communication with the wireless terminal 800 (e.g., by once again bringing the device 100 into proximity with the terminal 800), provide inputs to the device 100 (e.g., to authorize the use of the credential, to unlock the phone, or the like), or the like. In some implementations, upon decoupling from the case 110 (which is detected by the near-field wireless communication system 108, a described above), the device 100 displays information, prompts, a graphical user interface, or the like to the user. An example of the device 100 displaying information in response to being decoupled from the case is described with respect to FIG. 8D.

As noted above, in some implementations, the criteria for displaying a prompt to uncouple the device 100 from the case 110 includes additional sub-criteria. For example, in some implementations, the criteria for displaying a prompt to uncouple the device 100 from the case 110 are met when the device 100 is not able to (or fails to) to provide the information corresponding to the secure credential to the wireless terminal 800 in response to a first detection of the presence of the wireless terminal (e.g., option A in FIG. 8A) and when a second detection of the presence of the wireless terminal 800 is detected after failing to provide the information corresponding to the secure credential to the wireless terminal 800. For example, if, after determining that the information corresponding to the secure credential was not provided to the wireless terminal 800 after a first attempt (and optionally after displaying the error condition indication 830), there is another failed attempt to initiate the wireless interaction with the wireless terminal 800, the device 100 displays the prompt 832. In some implementations, the device allows more attempts to initiate the wireless interaction before displaying the prompt 832 (e.g., three attempts, four attempts, five attempts, or the like).

Figure 8C:
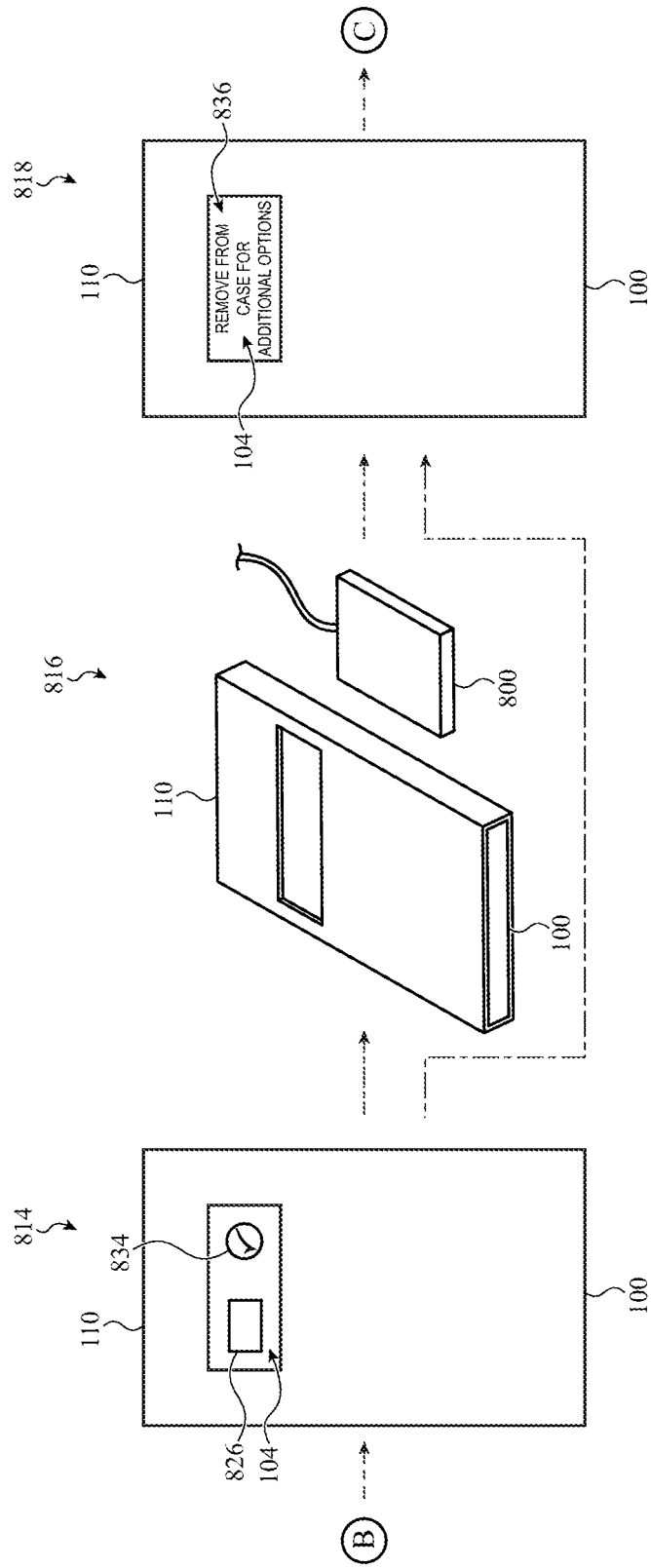

In some implementations, if the device 100 determines that the criteria for displaying the prompt to uncouple the device 100 from the case 110 has not been met (e.g., the device 100 is able to provide the information corresponding to the secure credential to the wireless terminal 800), the device 100 provides the information to the wireless terminal 800, and optionally displays a confirmatory visual indication. FIG. 8C, for example, illustrates the device 100 (coupled to the case 110) after determining that the device 100 is able to provide the information corresponding to the secure credential (and optionally after the device 100 determines that the information was successfully provided to the wireless terminal 800 and/or other success criteria have been met). For example, at stage 814, the device 100 is displaying a success condition indication 834, indicating that the device 100 successfully provided the information corresponding to the secure credential to the wireless terminal 800.

After the successful provision of the information corresponding to the secure credential to the wireless terminal 800, a user may optionally attempt to provide the same or another secure credential to the wireless terminal 800. In such cases, as shown at stage 816, the device 100 (while coupled to the case 110) is brought into proximity to the wireless terminal 800, and the device 100 detects the presence of the wireless terminal 800, as described above.

In some implementations, the criteria for displaying the prompt to uncouple the device 100 from the case 110 includes detecting a second attempt to initiate the wireless interaction after the first attempt. For example, in some implementations, in response to detecting the presence of the wireless terminal 800 a second time (e.g., as shown at stage 816, after the device 100 previously detected the wireless terminal 800 at stage 804), the device 100 determines that the criteria is met and displays (at stage 818) a prompt 836 to uncouple the device 100 from the case 110. In some implementations, the prompt 836 is different than the prompt 832, which reflects the differences in the reason for displaying the prompt. For example, the prompt 832 is displayed in response to the device 100 determining that it is not able to or did not successfully provide the information corresponding to the secure credential to the wireless terminal 800 (e.g., determined either due to a failure to transmit the information or a lack of confirmation from the wireless terminal 800). By contrast, in some implementations, the prompt 836 is displayed due to a policy that secure credentials can be provided to a wireless terminal only once (or a limited number of times) before the user must interact with the device 100 to provide additional information to the device (e.g., to unlock the device, authorize the provision of additional secure credentials, select a next secure credential, or the like). Thus, in some implementations, the prompt 836 is displayed in response to detecting the presence of the wireless terminal 800 after the information corresponding to the first secure credential was provided to the wireless terminal 800. In some implementations, the prompt 836 includes different textual information (e.g., "remove from case for additional options") than the prompt 832, signifying that additional options and/or interactions can be provided to the device 100 upon its removal from the case 110.

In some implementations, the criteria for displaying the prompt to uncouple the device 100 from the case 110 includes detecting a third attempt to initiate the wireless interaction. In some implementations, for example, the user is permitted to provide secure credentials, while the device 100 is in the case 110, two times before the device 100 requires further interaction with the device (e.g., to provide additional authorizations, select options for providing the credentials, or the like). Thus, when the device 100 detects a third attempt to initiate the wireless interaction (e.g., after two previous successful attempts), the criteria for displaying the prompt is met, and the prompt (e.g., the prompt 836) is displayed. In some implementations, more attempts are permitted before the criteria is met (e.g., three, four, five, or any other suitable number of successful attempts are permitted before the device 100 displays the prompt 836).

In some implementations, if the device 100 determines that an attempt to provide the information corresponding to a secure credential (e.g., a first attempt, a second attempt, a third attempt) is not able to be completed or was not completed (e.g., the information corresponding to the secure credential was not provided to the wireless terminal 800), the device 100 may display the prompt 832, and, optionally, the error condition indication 830.

Figure 8D:
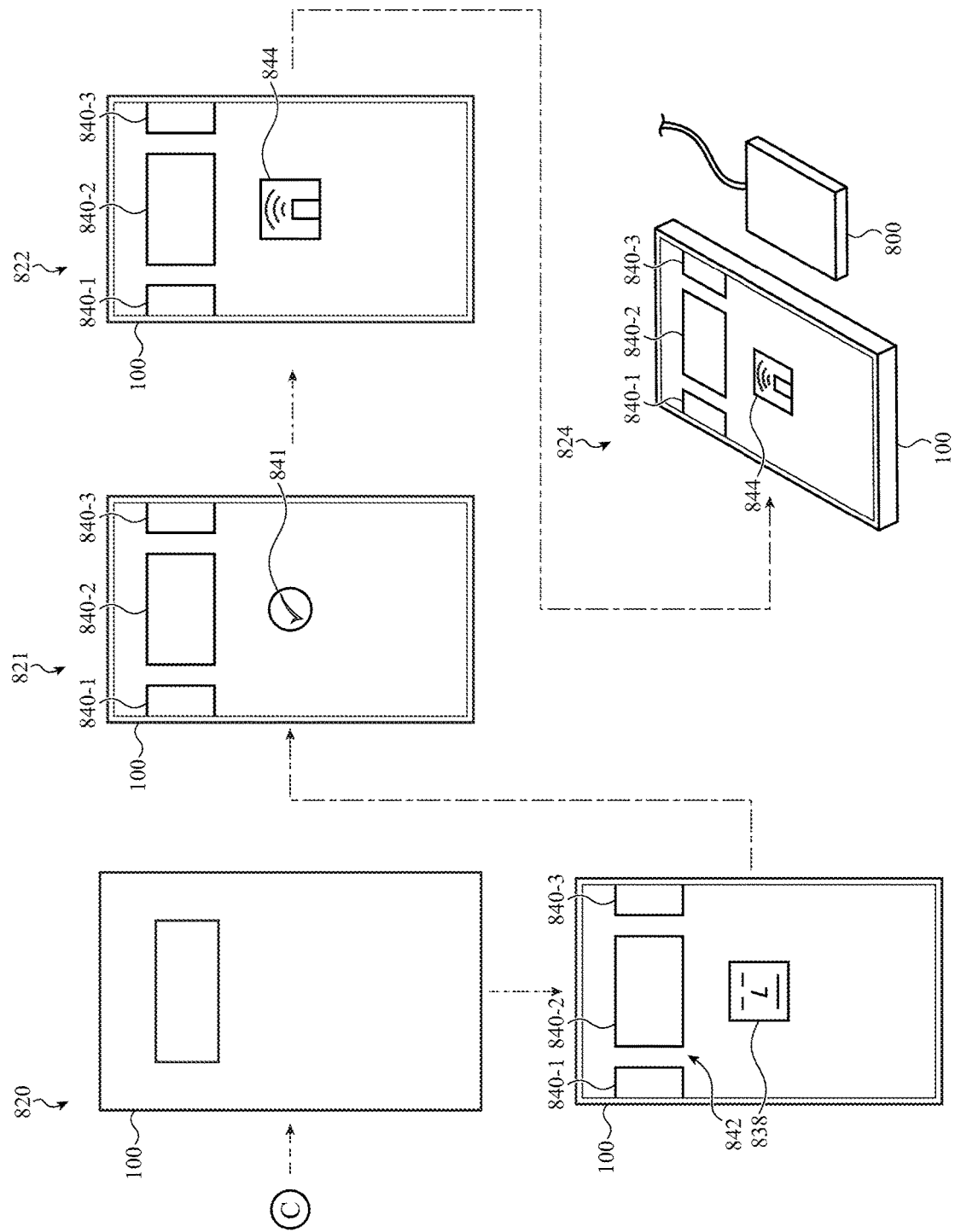

As described above, a user may be prompted to remove the device 100 from the case 110 based on different conditions being detected. FIG. 8D illustrates the device 100 being removed from the case 110 after the user has been prompted to do so, according to some implementations.

At stage 820, the device 100 is removed from the case 110. In some implementations, the device 100 is removed from the case 110 after the device 100 displays (or while the device 100 is displaying) the prompt to uncouple the device 100 from the case 110. The device 100 detects that it has been uncoupled from the case 110 via the near-field wireless communication system 108, as described above. In some implementations, the device 100 also or additionally detects that it has been removed from the case 110 using one or more sensors such as motion sensors, proximity sensors, magnetic sensors, or the like.

Figure 9A:
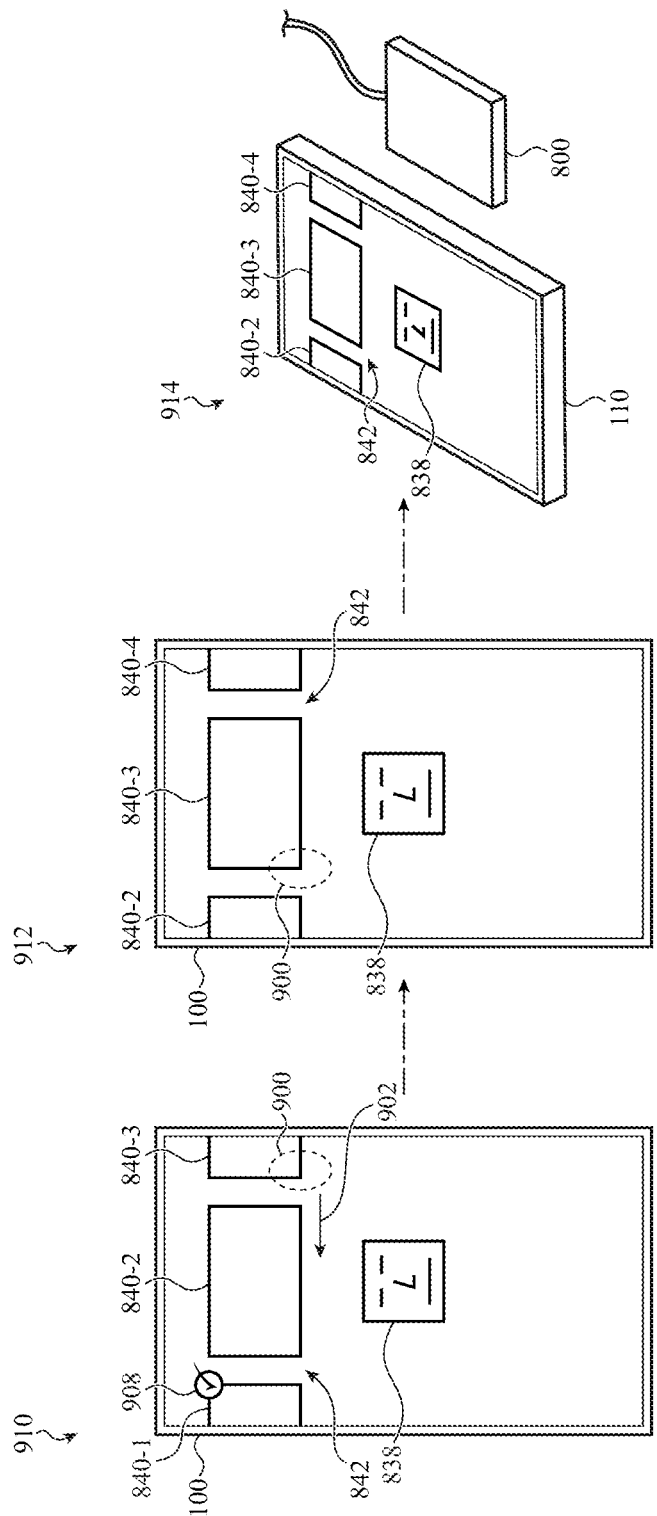
FIGS. 9A-9B depict example user interfaces for use in conjunction with selecting secure credentials to provide to a wireless terminal.
Figure 9B:
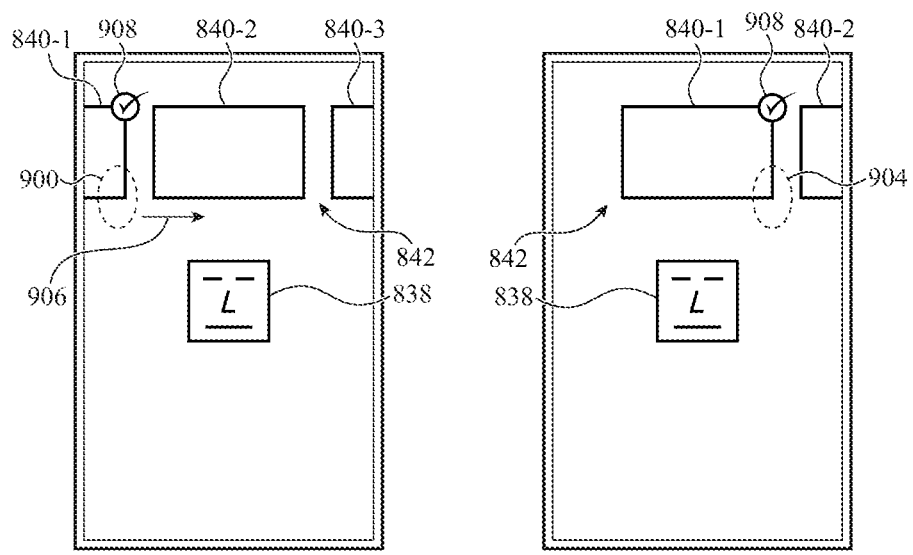

In response to detecting that it has been uncoupled from the case, the device 100 displays a user interface 842 associated with providing information corresponding to a secure credential to the wireless terminal 800. In some implementations, the user interface 842 includes graphical objects 840 (e.g., 840-1, 840-2, and 840-3) that represent respective secure credentials. For example, as noted above, in some implementations the device 100 includes a credential management application that manages a plurality of secure credentials that are available for use in different situations (e.g., the credential management application may manage one or more boarding passes, credit cards, debit cards, transit passes, loyalty cards, identification cards, secure area access cards, and the like). Accordingly, in some implementations, the graphical objects 840 represent secure credentials that are managed by the credential management application. In some implementations, the arrangement and/or positions of the graphical objects 840 may correspond to which secure credential the user interface 842 is associated with at that time. Thus, for example, if the first graphical object 840-1 is displayed in a central region, or is otherwise more prominently displayed in the user interface 842 (as shown in FIG. 9B, left side), the user interface 842 is associated with a first secure credential. If the second graphical object 840-2 is displayed in a central region (as shown in FIG. 8D and FIG. 9A, left side), the user interface 842 is associated with a second secure credential. In some implementations, the secure credential that is prominently displayed in the user interface 842 is the secure credential that the device 100 will attempt to provide to the wireless terminal 800 upon a next attempt to initiate the wireless interaction.

As shown, the graphical objects 840 resemble cards such as credit cards, debit cards, transit passes, loyalty cards, identification cards, and secure area access cards, though other types of graphical objects may be used instead of or in addition to cards. In some implementations, the graphical objects 840 have an appearance and/or include graphical and/or textual information that is consistent with or representative of a physical version of the credential. For example, a graphical object 840 representing a credit card may look like the credit card (and may have a card/bank name, cardholder name, partial account number, etc.), while a boarding pass may resemble a physical boarding pass (and may have a passenger name, seat assignment, gate assignment, etc.).

In some implementations, if the device 100 has already provided first information corresponding to a first secure credential (e.g., corresponding to the first graphical object 840-1) to the wireless terminal 800, and the device 100 has access to information corresponding to a second secure credential that is available to be provided to the wireless terminal (e.g., a second secure credential such as a second credit card, debit card, boarding pass, transit pass, loyalty card, identification card, secure area access card, etc., represented by the second graphical object 840-2), the user interface 842 displays the second graphical object 840-2 and optionally additional graphical objects, affordances, visual indicators, or other user interface objects, to facilitate the provision of the second secure credential to the wireless terminal 800. For example, as shown in FIG. 8D, in response to being removed from the case 110 after information corresponding to the first secure credential has been provided, the user interface 842 shows the second graphical object 840-2 (indicating that the second secure credential has been pre-selected and/or is available for providing to the wireless terminal 800), as well as a graphical object 838 that includes a representation of a biometric authentication process. In some implementations, the representation of the biometric authentication process includes a graphic that indicates what type of biometric authentication can approve or authorize the provision of the information corresponding to the second secure credential to a wireless terminal. For example, if a facial authentication system can approve or authorize the provision, the graphic represents a face. As another example, if a fingerprint authentication system can approve or authorize the provision, the graphic represents a fingerprint. Other graphics and biometric authentication processes are also contemplated, and may be displayed at stage 820 or at other stages.

Stage 821 depicts the device 100 after the biometric authentication process has been successfully completed, with the device 100 displaying a graphical object 841 indicating that the biometric authentication process has succeeded.

In some implementations, in response to a successful biometric authentication, at stage 822, the device displays a graphical object 844 that includes a representation of a wireless communication operation (e.g., a graphic that prompts the user to place the device on or near the wireless terminal 800).

In some implementations, while the graphical object representative of a second secure credential is displayed in the user interface 842 (and/or displayed more prominently than graphical objects representative of other secure credentials), the device 100 is placed in proximity to the wireless terminal 800 (e.g., at stage 824). The device 100 detects the presence of the wireless terminal 800 (e.g., with the near-field wireless communication system), and, in response to detecting the presence of the wireless terminal 800, the device 100 provides the information corresponding to the second secure credential to the wireless terminal 800. In some implementations, if the device 100 determines that it is not able to provide the information corresponding to the second secure credential to the wireless terminal 800 or did not successfully provide the information corresponding to the second secure credential to the wireless terminal 800

(e.g., determined either due to a failure to transmit the information or a lack of confirmation from the wireless terminal 800), the device 100 displays an error condition indication (e.g., the error condition indication 830), a text prompt, or the like. In some implementations, if the device 100 determines that it did successfully provide the information, the device 100 displays a success condition indication (e.g., the success condition indication 834).

In some implementations, if the prompt to uncouple the device 100 from the case 110 is not being displayed and/or has not been displayed when the device 100 is uncoupled from the case 110, a different user interface (e.g., different than the user interface 842) is displayed when the device 100 is uncoupled from the case 110. In some implementations, the different user interface is a home screen user interface with a plurality of application launch icons and/or widgets, a wake screen user interface with a date/time and one or more notifications, a phone call user interface if there is an incoming phone call, or the like.

In some implementations, a user can interact with the user interface 842, for example, to select which secure credential should be provided to the wireless terminal 800 next. FIGS. 9A-9B illustrate example interactions with the user interface 842.

FIG. 9A, for example, shows an example state of the user interface 842 when the device 100 is removed from the case 110 after information corresponding to a first secure credential was provided to the wireless terminal 800. As shown at stage 910, the user interface 842 includes a portion of a first graphical object 840-1, representing the first secure credential. In some implementations, the first graphical object 840-1 is shown with a visual indication 908 indicating that the information corresponding to the first secure credential has already been provided to the wireless terminal 800 (e.g., in response to a prior detection of the presence of the wireless terminal 800 that meets proximity criteria, as described above). The visual indication 908 signals to a user that there has been a successful transfer of that credential.

In some implementations, a user can interact with the user interface 842 to change and/or select the secure credential that will be provided to the wireless terminal 800 upon a next attempt. For example, in some implementations, a user applies a navigation input directed to the user interface 842 (e.g., a slide or swipe gesture indicated by the touch input 900 and the arrow 902 in FIG. 9A). In response to detecting the navigation input, the device 100 displays the third graphical object 840-3, representing a third secure credential (as shown at stage 912). In some implementations, the navigation input results in a scrolling appearance of the graphical objects, such that the first graphical object 840-1 ceases to be displayed (e.g., it is moved off the display to the left), all or a portion of the second graphical object 840-2 ceases to be displayed (e.g., it is moved off the display to the left), and the third graphical object 840-3 is displayed and/or moved into a prominent (e.g., center) position of the display. If there are additional secure credentials available to the device 100 (and that correspond to a type of secure credential that is associated with the wireless terminal 800), they may be represented by graphical objects that can be navigated to with further navigation inputs (e.g., the optional fourth graphical object 840-4 may be swiped into the prominent position of the display with a further navigation input). In some implementations, the graphical object that is in the prominent position (e.g., shown largest, or in the center of the display, or with a unique border or other graphical element, etc.) represents the secure credential that will be provided to the wireless terminal 800 when the device 100 is next brought into sufficient proximity with the wireless terminal 800.

In some implementations, a user can also interact with the user interface 842 to cause the first graphical object 840-1 to be displayed, even if the secure credential associated with the first graphical object 840-1 has already been provided to the wireless terminal 800, as illustrated in FIG. 9B. For example, in some implementations, a user applies a navigation input directed to the user interface 842 (e.g., a slide or swipe gesture indicated by the touch input 904 and the arrow 906 in FIG. 9B). In response to detecting the navigation input, the device 100 displays the first graphical object 840-1, representing a first secure credential. In some implementations, the first graphical object 840-1 is displayed in conjunction with the visual indication 908 indicating that the information corresponding to the first secure credential has already been provided to the wireless terminal 800.

In some implementations, the navigation input results in a scrolling appearance of the graphical objects, such that the first graphical object 840-1 moved into the prominent (e.g., center) position of the display (e.g., it is moved into the prominent position of the user interface 842 from the left of the display), and all or a portion of the second and third graphical objects 840-2, 840-3 cease to be displayed (e.g., they are moved off the display to the right).

In some implementations, as shown in FIGS. 9A-9B, the user interface 842 includes one or more additional graphical objects, such as a graphical object that indicates a next step for a user to take in order to provide a secure credential to the wireless terminal 800. In some implementations, for example, the user interface 842 includes the graphical object 838 representing a biometric authentication process, indicating that a biometric authentication is necessary to proceed. In some implementations, the user interface 842 instead or additionally displays the graphical object 844, prompting the user to place the device on or near the wireless terminal 800. While FIGS. 9A and 9B show the device 100 displaying the graphical object 838 representing the biometric authentication process, the graphical object 838 may be replaced by a different graphical object (e.g., the graphical object 841) when the biometric authentication process has been successfully completed.

As described herein, in some implementations, when the device 100 is uncoupled from the case 110, the device 100 may require a user authentication before proceeding to provide information corresponding to a secure credential to a wireless terminal. For example, FIG. 8D (stage 820) illustrates the device 100 displaying the graphical object 838 representing a biometric authentication process, indicating that a biometric authentication must be performed (or a suitable alternative such as the entry of a password) in order to authorize the device 100 to provide information corresponding to a secure credential.

For example, in some implementations, the device 100 detects that it has been uncoupled from the case (e.g., via the near-field wireless communication system 108, motion sensors, proximity sensors, and/or magnetic sensors). In some implementations, the device 100 detects that it has been uncoupled after displaying or while displaying the prompt to uncouple the computer system from the case (e.g., the prompt 836, FIG. 8C). In response to detecting that the device 100 has been uncoupled from the case 110, the device 100 captures biometric information (e.g., a face, iris, and/or fingerprint) of a user of the device. In some implementations, the device captures the biometric information without user input specifically requesting capture of biometric information of the user of the computer system other than uncoupling the computer system from the case.

In accordance with a determination that the biometric information captured by the device 100 is consistent with enrolled biometric information at the device (e.g., an enrolled face, enrolled iris, and/or enrolled fingerprint), the device 100 performs a secure operation (e.g., authorizing transmission of information corresponding to a secure credential to the wireless terminal 800, unlocking the device, authorizing transmission of the information corresponding to the secure credential to the wireless terminal without unlocking the device, unlocking the device without authorizing transmission of the information corresponding to the secure credential to the wireless terminal, or authorizing transmission of the information corresponding to the secure credential to the wireless terminal and concurrently unlocking the device, where unlocking the computer system includes transitioning the device from a locked state in which one or more functions of the device are not available for use to an unlocked state in which the one or more functions of the device that are not available in the locked state are available).

In accordance with a determination that the biometric information captured by the device 100 is not consistent with enrolled biometric information at the device 100, the device foregoes performance of the secure operation (and, optionally, provides audible, visual, or haptic feedback to the user indicating that authentication is required to perform the secure operation).

Figure 10:
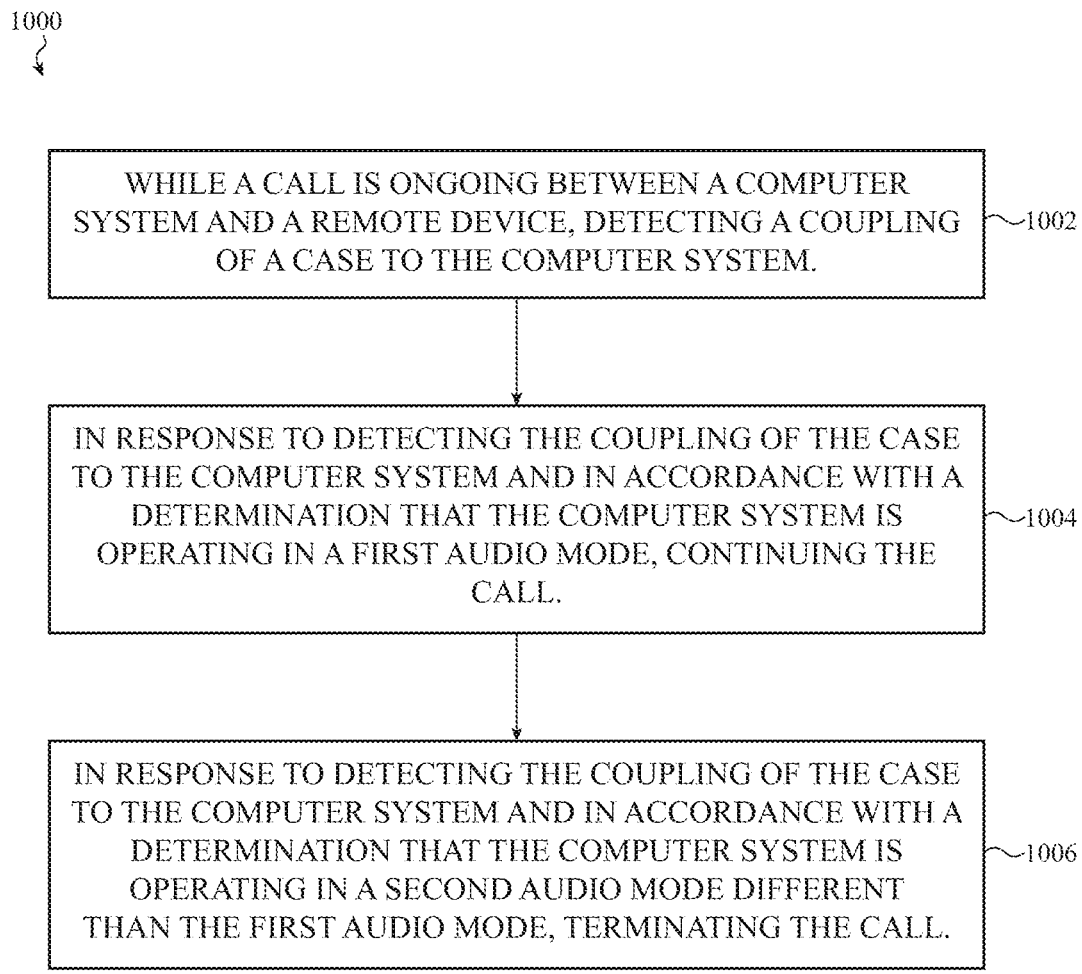
FIG. 10 is a flow chart of a method for use with a computer system.

FIG. 10 is a flow chart of an example method 1000 that includes either continuing or terminating an ongoing call at a device when the device is coupled to a case, depending at least in part on the audio mode of the device when the device is coupled to the case. In some implementations, the method 1000 is performed at a computer system with a display and a housing. As used herein, a computer system with a display and a housing may also be referred to as an electronic device (or simply device). Examples of such computer systems include, for example, the electronic device 100.

In some implementations, the computer system detects (1002), while a call is ongoing between the computer system and a remote device (e.g., a remote telephone), a coupling of a case to the computer system. FIGS. 1A-1B, for example, illustrate cases 110 (FIG. 1A) and 120 (FIG. 1B) being coupled to the device 100.

In response to detecting the coupling of the case to the computer system and in accordance with a determination that the computer system is operating in a first audio mode, the device continues (1004) the call. FIGS. 3A-5 illustrate examples in which a device 100 continues a call when the device 100 is coupled to a case 110 and when the computer system is operating in a first audio mode.

In some implementations, the first audio mode is a speakerphone mode in which the computer system is configured to produce an audio output that is audible to a user when the computer system is away from the user's ear, as illustrated with respect to FIG. 3A. FIGS. 4 and 5 also illustrate the device 100 operating in a speakerphone mode (e.g., an example of a first audio mode).

In some implementations, operating in the first audio mode comprises transmitting audio associated with the call to a remote speaker communicatively coupled to the computer system (e.g., a speaker of the remote speaker system 310 in FIG. 3B). In some implementations, the remote speaker is communicatively coupled to the computer system via a wireless communication link. In some implementations, the remote speaker is communicatively coupled to the computer system via a wired connection. FIG. 3B illustrates an example of a remote speaker system 310 communicatively coupled to the device 100 via a connection 312 (which represents wired and/or wireless connections).

In accordance with a determination that the computer system is operating in a second audio mode (e.g., a second audio output mode) different than the first audio mode, the device terminates (1006) the call. In some implementations, the second audio mode is a handset mode in which the computer system is configured to produce an audio output using an earpiece speaker configured to be placed adjacent a user's ear. FIG. 2 illustrates an example of the device 100 terminating an ongoing call in response to detecting the coupling of the case while a call is ongoing and the device is operating in a handset mode (e.g., an example of the second audio mode).

In some implementations, the method further includes, while the call is ongoing, outputting, via at least one of a speaker of the computer system or a remote speaker communicatively coupled to the computer system, audio content associated with the call, and displaying, on the display, video content associated with the call. In some implementations, the method further includes, in response to detecting the coupling of the case to the computer system and in accordance with the determination that the computer system is operating in the first audio mode, ceasing display of the video content and continuing to output the audio content.

In some implementations, the call is a first call, the remote device is a first remote device, and, while the first call is ongoing and while a second call between the computer system and a second remote device is ongoing, in response to detecting the coupling of the case to the computer system and in accordance with the determination that the computer system is operating in the first audio mode, the method further includes displaying first call information associated with the first call in a first region of the display and displaying second call information associated with the second call in the first region of the display. In some implementations, the first region of the display (e.g., first region 104, FIG. 1A) is visible through an opening in the case and a second region of the display (e.g., second region 106, FIG. 1A) is covered by the case. FIG. 5 illustrates an example in which two calls are ongoing (e.g., a first and a second call), and first and second call information (e.g., first call information 510 and second call information 512) are displayed in the first region of the display (e.g., first region 104).

In some implementations, the method further includes, in response to detecting the coupling of the case to the computer system and in accordance with the determination that the computer system is operating in the second audio mode (e.g., a handset mode), after terminating the call, displaying, in a first region of the display, a visual indication that the call has been terminated (e.g., the visual indication 212, FIG. 2). In some implementations, the first region of the display (e.g., first region 104, FIG. 1A) is visible through an opening in the case and a second region of the display (e.g., second region 106, FIG. 1A) is covered by the case.

In some implementations, the method further includes, in response to detecting the coupling of the case to the computer system and in accordance with the determination that the computer system is operating in the first audio mode, displaying, in a first region of the display, a visual indication including information about the call. In some implementations, the first region of the display (e.g., first region 104, FIG. 1A) is visible through an opening in the case and a second region of the display (e.g., second region 106, FIG. 1A) is covered by the case.

In some implementations, the method further includes, prior to detecting the coupling of the case to the computer system and while the call is ongoing, displaying, on the display, a visual indication including call information associated with the call, and, in response to detecting the coupling of the case to the computer system, reducing a size of the visual indication and displaying the reduced-size visual indication in a first region of the display. In some implementations, the first region of the display (e.g., first region 104, FIG. 1A) is visible through an opening in the case and a second region of the display (e.g., second region 106, FIG. 1A) is covered by the case.

In some implementations, in response to detecting the coupling of the case to the computer system and in accordance with a determination that the computer system is in a first state corresponding to a first authorization level (e.g., an unlocked state) when the coupling of the case is detected, the device transitions the computer system to a second state corresponding to a second authorization level different than the first authorization level (e.g., a locked state).

In some implementations, the call is a first call and the case is a first case of a first type (e.g., a type of case that covers at least part of the display) and the remote device is a first remote device, and the method further includes, while a second call is ongoing between the computer system and a second remote device, detecting a coupling of a second case to the computer system, the second case of a second type different than the first type (e.g., a shell-type case that does not cover the display). In some implementations, the method includes, in response to detecting the coupling of the second case to the computer system and in accordance with a determination that the computer system is operating in the first audio mode or the second audio mode, continuing the call.

Figure 11:
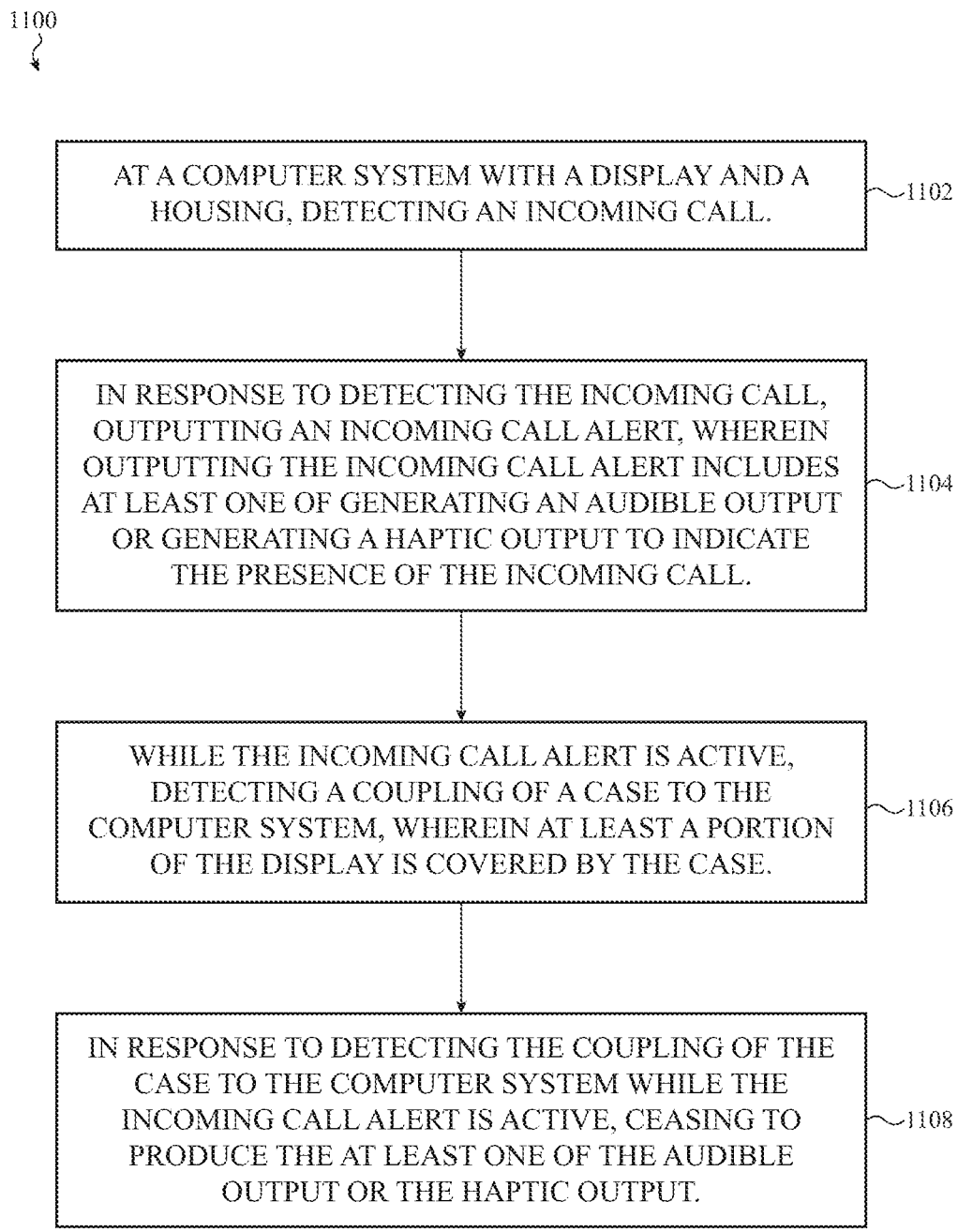
FIG. 11 is a flow chart of another method for use with a computer system.

FIG. 11 is a flow chart of an example method 1100 that includes changing one or more aspects of an incoming call alert at a device when a call is incoming when the device is coupled to a case. In some implementations, the method 1100 is performed at a computer system with a display and a housing. As used herein, a computer system with a display and a housing may also be referred to as an electronic device (or simply device). Examples of such computer systems include, for example, the electronic device 100.

In some implementations, the device detects (1102) an incoming call. In response to detecting the incoming call, the device outputs (1104) an incoming call alert, wherein outputting the incoming call alert includes at least one of generating an audible output (e.g., the audible output 606 in FIGS. 6A-6B) or generating a haptic output (e.g., the haptic output 604, FIGS. 6A-6B) to indicate the presence of the incoming call.

In some implementations, outputting the incoming call alert includes displaying, on the display, a visual indication including information about the incoming call (e.g., the visual indication 611, FIG. 6A). In some implementations, the visual indication (e.g., the visual indication 611, FIG. 6A) is a first visual indication, and the method further includes, in response to detecting the coupling of the case to the computer system while the incoming call alert is active, displaying a second visual indication (e.g., the visual indication 614, FIG. 6A) in a first region of the display (as shown, for example, in FIG. 6A). In some implementations, the first region of the display (e.g., first region 104, FIG. 1A) is visible through an opening in the case and a second region of the display (e.g., second region 106, FIG. 1A) is covered by the case. In some implementations, the second visual indication has a smaller size than the first visual indication (and includes the same graphics/information as the first visual indication). FIG. 6A illustrates an example in which the second visual indication (e.g., the visual indication 614, FIG. 6A) has a smaller size than the first visual indication (e.g., the visual indication 611, FIG. 6A).

In some implementations, while the incoming call alert is active, the device detects (1106) a coupling of a case (e.g., the cases 110, 120, FIGS. 1A-1B), to the computer system, wherein at least a portion of the display is covered by the case. FIGS. 6A-6B, for example, illustrate the device 100 being coupled to the case 110 while the incoming call alert is active.

In some implementations, in response to detecting the coupling of the case to the computer system while the incoming call alert is active, the device ceases to produce (1108) the at least one of the audible output or the haptic output. FIGS. 6A-6B, for example, show the device 100 ceasing to produce the audible output 606 and the haptic output 604 in response to the device 100 detecting the coupling of the case 110 to the device 100.

In some implementations, in response to detecting the coupling of the case (e.g., the cases 110, 120, FIGS. 1A-1B) to the computer system while the incoming call alert is active, the device ceases to produce the at least one of the audible output or the haptic output without declining the incoming call. FIGS. 6A-6B, for example, depict the device 100 with the incoming call still active even after the device 100 has been put inside the case 110.

In some implementations, the method includes, after detecting the coupling of a case to the computer system and after ceasing to produce the at least one of the audible output or the haptic output, detecting an accept-call input (e.g., via a separate device in communication with the computer system, such as headphones, a watch, a vehicle infotainment system), and in response to detecting the accept-call input, accepting the call.

In some implementations, in response to detecting the coupling of the case to the computer system and in accordance with a determination that the computer system is in a first state corresponding to a first authorization level (e.g., an unlocked state) when the coupling of the case is detected, the device transitions the computer system to a second state corresponding to a second authorization level different than the first authorization level (e.g., a locked state).

FIG. 12 is a flow chart of an example method 1200 that includes providing information corresponding to a secure credential to a wireless terminal, as described with respect to FIGS. 8A-9B, for example. In some implementations, the method 1200 is performed at a computer system with a display and a housing. As used herein, a computer system with a display and a housing may also be referred to as an electronic device (or simply device). Examples of such computer systems include, for example, the electronic device 100.

In some implementations, the computer system (which includes a display, housing, and a wireless antenna), while the computer system is coupled to a case, detects (1202), via the wireless antenna (e.g., a wireless antenna of the near-field wireless communications system 108, FIG. 1A), the presence of a wireless terminal (e.g., the wireless terminal 800, FIG. 8A). In some implementations, detecting the presence of a wireless terminal includes detecting a wireless signal from the wireless terminal that meets proximity criteria such as a wireless signal strength criteria or a distance proximity criteria that indicates that the computer system has been intentionally moved close to the wireless terminal as an indication of user intent to provide one or more secure credentials to the wireless terminal). In some implementations, the wireless terminal is optionally one of a wireless terminal, a wireless authentication terminal, a wireless payment terminal, or a wireless credential terminal. For example, FIG. 8A illustrates the device 100 detecting the presence of the wireless terminal 800 while the device 100 is in the case 110. In some implementations, the secure credential is associated with a credential management application on the computer system that manages a plurality of secure credentials that are available for use in different situations (e.g., one or more boarding passes, credit cards, debit cards, transit passes, loyalty cards, identification cards, secure area access cards, and the like).

In some implementations, a first region of the display of the computer system is visible when the computer system is coupled to the case. Optionally, a second region of the display of the computer system is covered by the case when the computer system is coupled to the case). FIGS. 1A-1B and 3A-8D illustrate the example device 100 in use with cases that cover a second region of the display (e.g., second region 106) and define a window or opening such that a first region of the display (e.g., first region 104) is visible when the device 100 is used with the cases.

In response to detecting the presence of the wireless terminal (e.g., via a wireless signal from the wireless terminal that meets the proximity criteria) that is associated with a respective type of secure credential, and in accordance with a determination that the detection of the presence of the wireless terminal meets respective criteria, wherein the respective criteria include a requirement that a computer system is not able to provide information corresponding to the secure credential to the wireless terminal in response to detecting the presence of the wireless terminal in order for the respective criteria to be met, the computer system displays (1204), in the first region of the display, a prompt to uncouple the computer system from the case. For example, FIG. 8B, illustrates the device 100 displaying a prompt 832 to uncouple the device 100 from the case 110, where the prompt was displayed in response to detecting that the presence of the wireless terminal 800 meets a criteria (e.g., that the device 100 was not able to provide a secure credential, that the device 100 attempted to provide the secure credential but the secure credential was not received by the wireless terminal 800, or the like). FIG. 8C, illustrates the device 100 displaying a prompt 836 to uncouple the device 100 from the case 110, where the prompt was displayed in response to detecting that the presence of the wireless terminal 800 meets a different criteria (e.g., the device 100 already provided to the wireless terminal 800 a maximum amount of secure credentials that are permitted without further user authorization).

In some implementations, in response to detecting the presence of the wireless terminal that is associated with a respective type of secure credential, and in accordance with a determination that the presence of the wireless terminal does not meet the respective criteria, the computer system provides (1206), via the wireless antenna (e.g., a wireless antenna associated with the near-field wireless communications system 108), the information corresponding to the secure credential to the wireless terminal. Thus, for example, if the criteria for displaying the prompt to uncouple the computer system from the case are not met (e.g., including, in some implementations, the computer system determining that it is able to provide the information corresponding to the secure credential to the wireless terminal), the computer system will proceed to provide the information corresponding to the secure credential to the wireless terminal 800. FIGS. 8A and 8C, for example, illustrate the device 100 determining that the criteria for displaying the uncoupling prompt are not met, and therefore providing the information corresponding to the secure credential to the wireless terminal 800 (at stages 802, 804, 806, and 814).

As described herein, various criteria, if they are met, result in the computer system displaying the prompt to uncouple the computer system from a case. In some implementations, for example, the respective criteria (e.g., for displaying a prompt such as the prompt 832, FIG. 8B or the prompt 836, FIG. 8C) are met when first information corresponding to a first secure credential was provided to the wireless terminal in response to a first detection of the presence of the wireless terminal, and a second detection of the presence of the wireless terminal is detected after providing the first information corresponding to the first secure credential to the wireless terminal. FIGS. 8A and 8C, for example, illustrate the device 100 providing the prompt 836 in response to the device 100 detecting the presence of the wireless terminal 800 (stages 816, 818 in FIG. 8C) after the device 100 already provided information corresponding to a first secure credential to the wireless terminal 800 (as illustrated in stages 802, 804, 806 in FIG. 8A and stage 814 in FIG. 8C).

In some implementations, the respective criteria are met when the computer system failed to provide the information corresponding to the secure credential to the wireless terminal in response to a first detection of the presence of the wireless terminal (e.g., as depicted in stages 802, 804, 806, and 810 in FIGS. 8A-8B), a second detection of the presence of the wireless terminal is detected after failing to provide the information corresponding to the secure credential to the wireless terminal, and the computer system is not able to provide the information corresponding to the secure credential to the wireless terminal in response to the second detection of the presence of the wireless terminal (e.g., as depicted in stages 811 and 812 in FIG. 8B).

In some implementations, the respective criteria are met when computer system fails to provide the information corresponding to the secure credential to the wireless terminal in response to detection of the presence of the wireless terminal. For example, the prompt 832, as depicted at stage 812 in FIG. 8B, may be displayed in response to the device 100 determining that it failed to provide the information corresponding to the secure credential to the wireless terminal 800.

In some implementations, after displaying and/or while displaying the prompt to uncouple the computer system from the case, the computer system detects that it has been uncoupled from the case (e.g., with then near-field wireless communication system 108, and/or one or more sensors such as motion sensors, proximity sensors, magnetic sensors, or the like). In response to detecting that the computer system has been uncoupled from the case, the device displays a user interface associated with providing information corresponding to a secure credential to the wireless terminal. FIGS. 8D-9B depict an example user interface 842 that the device 100 displays in response to detecting that it has been uncoupled from the case 110.

In some implementations, the computer system has already provided first information corresponding to a first secure credential to the wireless terminal and the computer system has access to information corresponding to a second secure credential that is available to be provided to the wireless terminal. In such cases, in some implementations, the user interface associated with providing information corresponding to a secure credential to the wireless terminal is a user interface associated with providing the information corresponding to the second secure credential to the wireless terminal. For example, FIG. 8D shows the device 100 displaying, in the user interface 842, a second graphical object 840-2, which corresponds to a second secure credential that may be provided to the wireless terminal 800. The second graphical object 840-2 is shown (e.g., prominently) in the user interface 842 because the device 100 has access to the information corresponding to the second secure credential (e.g., in a credential management application of the device 100), and because the device 100 already provided information corresponding to a first secure credential (e.g., information corresponding to the secure credential, represented by the first graphical object 840-1, was successfully provided to the wireless terminal 800, as depicted in stages 804, 806, and 814 in FIGS. 8A and 8C).

In some implementations, while the computer system is displaying the user interface associated with providing the information corresponding to the second secure credential to the wireless terminal (e.g., the user interface 842 as shown in FIG. 8D), detecting the presence of the wireless terminal (e.g., at stage 824 in FIG. 8D), and in response to detecting the presence of the wireless terminal, the computer system provides, via the wireless antenna (e.g., associated with the near-field wireless communication system 108), the information corresponding to the second secure credential to the wireless terminal.

In some implementations, the computer system has already provided first information corresponding to a first secure credential to the wireless terminal, and the method further includes, while displaying the user interface associated with providing the information corresponding to the second secure credential to the wireless terminal, detecting a navigation input directed to the user interface associated with providing the information corresponding to the second secure credential to the wireless terminal (e.g., a left to right or right to left swipe input directed to a location that corresponds to a graphical representation of the second secure credential in the user interface), and, in response to detecting the navigation input directed to the user interface associated with providing the information corresponding to the second secure credential to the wireless terminal, displaying a user interface associated with the first secure credential. Optionally, the computer system ceases to display at least a portion of the user interface associated with providing the second secure credential to the wireless terminal (e.g., the computer system ceases to display a graphical object that represents the second secure credential). FIG. 9B, for example, shows the device 100 displaying the user interface 842 prominently displaying the second graphical object 840-2 (e.g., corresponding to the second secure credential), and detecting a navigation input (e.g., a slide or swipe gesture indicated by the touch input 904 and the arrow 906 in FIG. 9B). Upon detecting the navigation input, the device 100 shows the user interface 842 with the first graphical object 840-1, corresponding to the first secure credential (e.g., the first graphical object 840-1 replaces the second graphical object 840-2 in a prominent region of the user interface, and at least a portion of the second graphical object 840-2 is no longer displayed).

In some implementations, the user interface associated with the first secure credential includes a visual indication that the information corresponding to the first secure credential has already been provided to the wireless terminal (e.g., in response to a prior detection of the presence of the wireless terminal that meets the proximity criteria). For example, as shown in FIGS. 9A-9B, the first graphical object 840-1, which corresponds to the first secure credential, is shown with a visual indication 908 indicating that the information corresponding to the first secure credential has already been provided to the wireless terminal 800.

In some implementations, the method further includes, while the computer system is displaying the user interface associated with providing the information corresponding to the second secure credential to the wireless terminal, detecting a navigation input directed to the user interface associated with providing the information corresponding to the second secure credential to the wireless terminal (e.g., a left to right or right to left swipe input directed to a location that corresponds to a graphical representation of the second secure credential in the user interface), and, in response to detecting the navigation input directed to the user interface associated with providing the information corresponding to the second secure credential to the wireless terminal, displaying a user interface associated with a third secure credential that is different from the first secure credential and the second secure credential. Optionally, the computer system ceases to display at least a portion of the user interface associated with providing the second secure credential to the wireless terminal (e.g., the computer system ceases to display a graphical object that represents the second secure credential). FIG. 9A, for example, shows the device 100 displaying the user interface 842 prominently displaying the second graphical object 840-2 (e.g., corresponding to the second secure credential), and detecting a navigation input (e.g., a slide or swipe gesture indicated by the touch input 900 and the arrow 902 in FIG. 9A). Upon detecting the navigation input, the device 100 shows the user interface 842 with the third graphical object 840-3, corresponding to the third secure credential (e.g., the third graphical object 840-3 replaces the second graphical object 840-2 in a prominent region of the user interface, and at least a portion of the second graphical object 840-2 is no longer displayed). In some implementations, the device has access to more than three secure credentials, and the user may navigate through however many the graphical objects (and thus secure credentials) are available on the device and/or for the particular type of wireless terminal with which the device 100 is being used (e.g., for a payment terminal the available secure credentials correspond to available payment types).

In some implementations, the method includes, while displaying the user interface associated with providing information corresponding to the third secure credential to the wireless terminal, detecting the presence of the wireless terminal, and, in response to detecting the presence of the wireless terminal, providing (e.g., via a wireless antenna of the near-field wireless communications system 108), the information corresponding to the third secure credential to the wireless terminal. For example, FIG. 9A illustrates, at stage 914, the device 100 displaying the user interface 842 associated with the third secure credential (e.g., the user interface 842 is prominently displaying the third graphical object 840-3 corresponding to the third credential) is placed in proximity to the wireless terminal 800, such that the device 100 detects the presence of the wireless terminal (e.g., the presence of the wireless terminal 800 meets a proximity criteria, as described above) and, in response, provides information corresponding to the third secure credential to the wireless terminal 800.

In some implementations, the computer system detects that it has been uncoupled from the case (e.g., via the near-field wireless communication system 108, motion sensors, proximity sensors, and/or magnetic sensors). In some implementations, the computer system detects that it has been uncoupled after displaying or while displaying the prompt to uncouple the computer system from the case (e.g., the prompt 836, FIG. 8C). In response to detecting that the computer system has been uncoupled from the case 110, the computer system captures biometric information (e.g., a face, iris, and/or fingerprint) of a user of the device. In some implementations, the device captures the biometric information without user input specifically requesting capture of biometric information of the user of the computer system other than uncoupling the computer system from the case.

In accordance with a determination that the biometric information captured by the computer system is consistent with enrolled biometric information at the device (e.g., an enrolled face, enrolled iris, and/or enrolled fingerprint), the computer system performs a secure operation (e.g., authorizing transmission of information corresponding to a secure credential to the wireless terminal 800, unlocking the device, authorizing transmission of the information corresponding to the secure credential to the wireless terminal without unlocking the device, unlocking the device without authorizing transmission of the information corresponding to the secure credential to the wireless terminal, or authorizing transmission of the information corresponding to the secure credential to the wireless terminal and concurrently unlocking the device, where unlocking the computer system includes transitioning the device from a locked state in which one or more functions of the device are not available for use to an unlocked state in which the one or more functions of the device that are not available in the locked state are available).

In accordance with a determination that the biometric information captured by the computer system is not consistent with enrolled biometric information at the computer system, the device foregoes performance of the secure operation (and, optionally, provides audible, visual, or haptic feedback to the user indicating that authentication is required to perform the secure operation).

Figure 13:
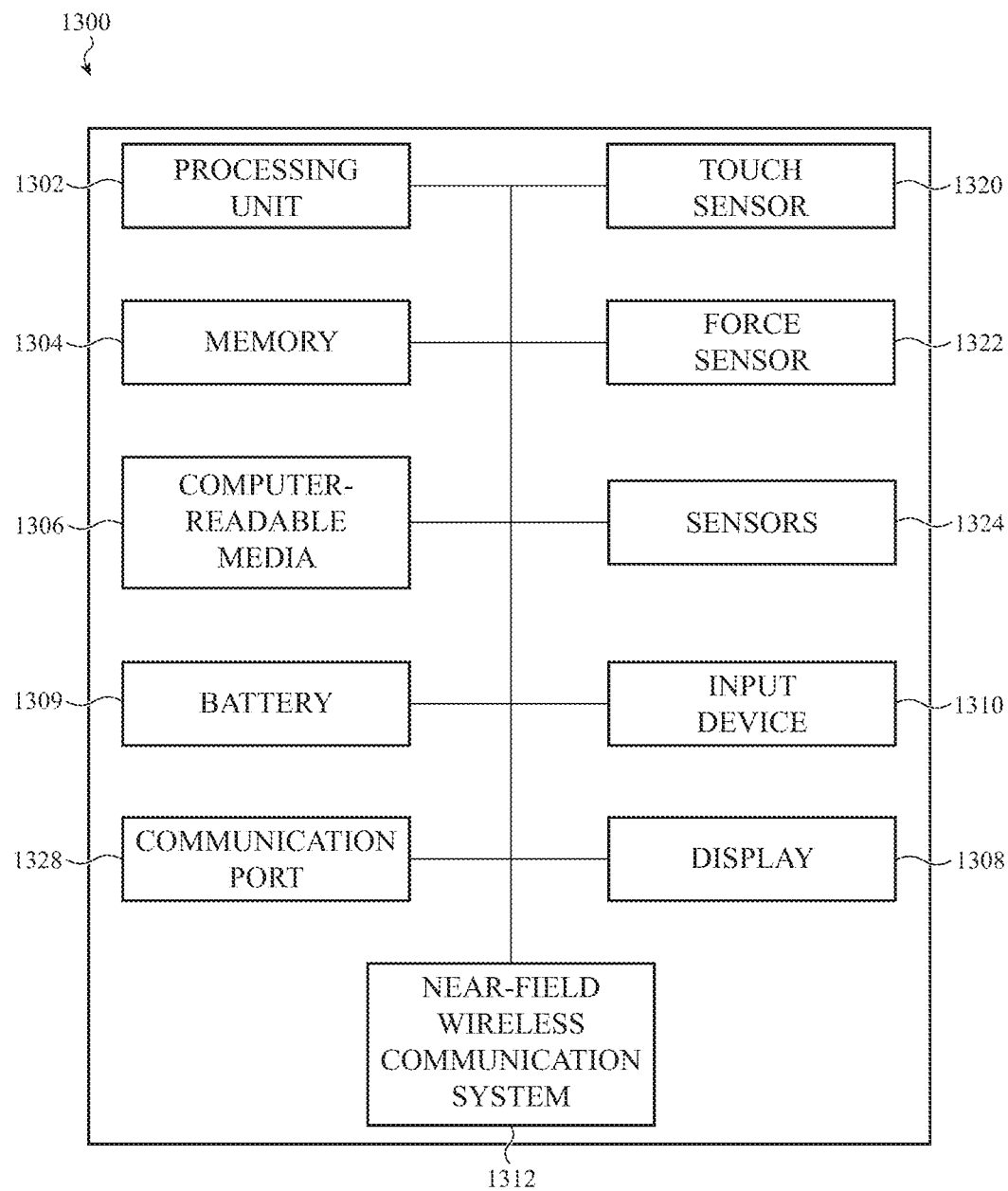
FIG. 13 depicts example components of an electronic device.

FIG. 13 depicts an example schematic diagram of a computer system 1300. The computer system 1300 may correspond to the electronic device 100 shown in FIGS. 1A-9B. To the extent that multiple functionalities, operations, and structures are disclosed as being part of, incorporated into, or performed by the computer system 1300, it should be understood that various embodiments may omit any or all such described functionalities, operations, and structures. Thus, different embodiments of the computer system 1300 may have some, none, or all of the various capabilities, apparatuses, physical features, modes, and operational parameters discussed herein. Further, details of the electronic device 100 that are shown and/or described herein will be understood to apply equally to the computer system 1300. For example, device components (e.g., attachment mechanisms, housings, antennas, etc.), application software, graphical user interfaces, etc., may all be embodied by the computer system 1300. Further, any of the components, hardware, software, or other systems or components described with respect to the computer system 1300 may equally be included in the electronic device 100.

As shown in FIG. 13, a computer system 1300 includes a processing unit 1302 operatively connected to computer memory 1304 and/or computer-readable media 1306. The processing unit 1302 may be operatively connected to the memory 1304 and computer-readable media 1306 components via an electronic bus or bridge. The processing unit 1302 may include one or more computer processors or microcontrollers that are configured to perform operations in response to computer-readable instructions. The processing unit 1302 may include the central processing unit (CPU) of the device. Additionally or alternatively, the processing unit 1302 may include other processors within the device including application specific integrated chips (ASIC) and other microcontroller devices.

In some implementations, the processing unit 1302 includes a secure processing element. The secure processing element may include a separate processor or processing circuit that includes a random number generator, hardware ID, hardware-based key manager, and/or other security features used to facilitate secure operations. In some implementations, the secure processing element includes a coprocessor that is isolated or separate from a main processor (which corresponds to another part of the processing unit 1302). The secure processing element may be a system on chip (SoC), which may be integrated with secure memory elements, random number generators, and other associated circuitry. The secure processing element and a main processor may be separately packaged chips, or they may share a common die. In some implementations, key data (which is private key data used to decrypt encrypted data) is encrypted in an element (e.g., a SoC element) of the secure processing element. The secure processing element may help to maintain the integrity of cryptographic operations even if the device kernel (executed by a main processor of the processing unit 1302, for example) has been compromised (e.g., because the main processor and the coprocessor are decoupled). Communication between the secure processing element and the main processor may be controlled using an interrupt-driven mailbox and shared memory data buffers. Other secure and isolating communication schemes may also be used.

The memory 1304 may include a variety of types of non-transitory computer-readable storage media, including, for example, read access memory (RAM), read-only memory (ROM), erasable programmable memory (e.g., EPROM and EEPROM), or flash memory. The memory 1304 is configured to store computer-readable instructions, sensor values, and other persistent software elements. Computer-readable media 1306 also includes a variety of types of non-transitory computer-readable storage media, including, for example, a hard-drive storage device, a solid-state storage device, a portable magnetic storage device, or other similar device. The computer-readable media 1306 may also be configured to store computer-readable instructions, sensor values, and other persistent software elements.

In this example, the processing unit 1302 is operable to read computer-readable instructions stored on the memory 1304 and/or computer-readable media 1306. The computer-readable instructions may be provided as a computer-program product, software application, or the like.

As shown in FIG. 13, the computer system 1300 also includes a display 1308. The display 1308 may include a liquid-crystal display (LCD), organic light emitting diode (OLED) display, light emitting diode (LED) display, or the like. If the display 1308 is an LCD, the display 1308 may also include a backlight component that can be controlled to provide variable levels of display brightness. If the display 1308 is an OLED or LED type display, the brightness of the display 1308 may be controlled by modifying the electrical signals that are provided to display elements. The display 1308 may correspond to any of the displays shown or described herein, such as the display 102 (FIG. 1A).

The computer system 1300 may also include a battery 1309 that is configured to provide electrical power to the components of the computer system 1300. The battery 1309 may include one or more power storage cells that are linked together to provide an internal supply of electrical power. The battery 1309 may be operatively coupled to power management circuitry that is configured to provide appropriate voltage and power levels for individual components or groups of components within the computer system 1300. The battery 1309, via power management circuitry, may be configured to receive power from an external source, such as an AC power outlet, a charging dock, a battery-enabled protective case, or the like. The battery 1309 may store received power so that the computer system 1300 may operate without connection to an external power source for an extended period of time, which may range from several hours to several days. Power management circuitry may include wireless charging components, such as a charging coil that inductively couples to an output coil of a wireless charger to charge the battery 1309.

In some embodiments, the computer system 1300 includes one or more input devices 1310. An input device 1310 is a device that is configured to receive user input. The one or more input devices 1310 may include, for example, a rotatable input system, a push button, a touch-activated button, a keyboard, a key pad, or the like (including any combination of these or other components). In some embodiments, the input device 1310 may provide a dedicated or primary function, including, for example, a power button, volume buttons, home buttons, scroll wheels, and camera buttons.

The computer system 1300 may also include one or more sensors 1324. The sensor(s) 1324 may detect inputs provided by a user to one or more of the input devices 1310 of the computer system 1300, or detect other events and/or conditions of the computer system 1300. The sensor(s) 1324 may also include a biometric sensor, such as a heart rate sensor, electrocardiograph sensor, temperature sensor, or any other type of sensor. In cases where a sensor 1324 is a biometric sensor, it may include biometric sensing circuitry, as well as portions of a crown that conductively couple a user's body to the biometric sensing circuitry. Biometric sensing circuitry may include components such as processors, capacitors, inductors, transistors, analog-to-digital converters, or the like. The sensor(s) 1324 may also include motion sensors, proximity sensors, ambient light sensors, magnetic sensors, ultrasonic sensors, or the like.

The computer system 1300 may also include a touch sensor 1320 that is configured to determine a location of a touch on a touch-sensitive surface of the computer system 1300 (e.g., an input surface defined by the transparent cover 105). The touch sensor 1320 may use or include capacitive sensors, resistive sensors, surface acoustic wave sensors, piezoelectric sensors, strain gauges, or the like. In some cases, the touch sensor 1320 associated with a touch-sensitive surface of the computer system 1300 may include a capacitive array of electrodes or nodes that operate in accordance with a mutual-capacitance or self-capacitance scheme. The touch sensor 1320 may be integrated with one or more layers of a display stack (e.g., the display 102, FIG. 1A) to provide the touch-sensing functionality of a touchscreen.

The computer system 1300 may also include a force sensor 1322 that is configured to receive and/or detect force inputs applied to a user input surface of the computer system 1300 (e.g., a surface of the transparent cover 105). The force sensor 1322 may use or include capacitive sensors, resistive sensors, surface acoustic wave sensors, piezoelectric sensors, strain gauges, or the like. In some cases, the force sensor 1322 may include or be coupled to capacitive sensing elements that facilitate the detection of changes in relative positions of the components of the force sensor (e.g., deflections caused by a force input). The force sensor 1322 may be integrated with one or more layers of a display stack (e.g., the display 102) to provide force-sensing functionality of a touchscreen.

The computer system 1300 may also include a communication port 1328 that is configured to transmit and/or receive signals or electrical communication from an external or separate device. The communication port 1328 may be configured to couple to an external device via a cable, adaptor, or other type of electrical connector. In some embodiments, the communication port 1328 may be used to couple the computer system 1300 to an accessory, including a dock or case, a stylus or other input device, smart cover, smart stand, keyboard, or other device configured to send and/or receive electrical signals.

The computer system 1300 may also include a near-field wireless communication system 1312 (which may correspond to the near-field wireless communication system 108 in FIG. 1A). The near-field wireless communication system may include one or more antennas and associated circuitry for detecting the presence of other near-field wireless communication antennas and/or systems (e.g., near-field wireless communication antennas of cases (e.g., the cases 110, 120, 130, FIGS. 1A-1C), wireless terminals (e.g., the wireless terminal 800, FIG. 8A), and/or other accessories (e.g., charging docks, wallet accessories, auxiliary battery accessories, etc.). The near-field wireless communication system 1312 may be configured to operate using any suitable type or protocol of near-field wireless communications, including but not limited to near-field communications ("NFC") protocols, radio frequency identification ("RFID") protocols, or any other suitable type or protocol. The near-field wireless communication system 1312 may be configured to detect near-field wireless communication antennas through a single side of the device (e.g., the back side), or multiple sides (e.g., any combination of sides including all sides).

While the computer system 1300 is described as having a particular set of components, the computer system 1300 is not limited to only those components described herein. For example, a device may include more than one of the components described with respect to FIG. 13 or elsewhere in the instant application, and may indeed include other components not described herein.

The foregoing description shows and describes various types of graphical objects that may be displayed by a device in response to the device detecting that it is being used with a near-field wireless enabled accessory. The graphical objects may take the form of or include icons, graphical user interfaces, background images, notification objects (e.g., for temporary notifications), or the like. The graphical objects may be programmatically associated with any suitable application, program, or operating system of the device, and/or may originate from any suitable layer of the Open Systems Interconnection model (OSI model). For example, in cases where the device detects an accessory and in response temporarily displays a notification object over a part of a primary graphical user interface of an operating system, the notification object may be programmatically associated with or originate from the operating system. As another example, in cases where the device detects an accessory and in response initiates an application, the graphical user interface of the application may be programmatically associated with or originate from the application (where an application may be defined as a software program that is executed by or on the operating system).

As described above, one aspect of the present technology is the gathering and use of data available from various sources to improve the usefulness of the devices described herein. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to the benefit of users. For example, the personal information data can be used to provide customized graphical user interfaces and user experiences. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. A method comprising:
   at a computer system with a display and a housing:
   maintaining a first call between the computer system and a first remote device during a first time period; and
   during the first time period:
   detecting a first insertion of the computer system into a case; and
   in response to detecting the first insertion of the computer system into the case:
   determining that the computer system is operating in a first audio mode; and
   in accordance with the determination that the computer system is operating in the first audio mode, continuing the call; and
   maintaining a second call between the computer system and a second remote device during a second time period; and
   during the second time period:
   detecting a second insertion of the computer system into the case; and
   in response to detecting the second insertion of the computer system into the case:
   determining that the computer system is operating in a second audio mode different from the first audio mode; and
   in accordance with the determination that the computer system is operating in the second audio mode, terminating the call.

2. The method of claim 1, wherein the first audio mode is a speakerphone mode in which the computer system is configured to produce an audio output that is audible to a user when the computer system is away from an ear of the user.

3. The method of claim 1, wherein operating in the first audio mode comprises transmitting audio associated with the call to a remote speaker communicatively coupled to the computer system.

4. The method of claim 3, wherein the remote speaker is communicatively coupled to the computer system via a wireless communication link.

5. The method of claim 3, wherein the remote speaker is communicatively coupled to the computer system via a wired connection.

6. The method of claim 1, wherein the second audio mode is a handset mode in which the computer system is configured to produce an audio output using an earpiece speaker configured to be placed adjacent an ear of a user.

7. The method of claim 1, further comprising:
   while the call is ongoing:
   outputting, via at least one of a speaker of the computer system or a remote speaker communicatively coupled to the computer system, audio content associated with the call; and
   displaying, on the display, video content associated with the call; and
   in response to detecting the coupling of the case to the computer system and in accordance with the determination that the computer system is operating in the first audio mode:
   ceasing display of the video content; and
   continuing to output the audio content.

8. The method of claim 1, wherein:
   the call is a first call;
   the remote device is a first remote device; and
   while the first call is ongoing and while a second call between the computer system and a second remote device is ongoing:
   in response to detecting the coupling of the case to the computer system and in accordance with the determination that the computer system is operating in the first audio mode:
   displaying first call information associated with the first call in a first region of the display; and
   displaying second call information associated with the second call in the first region of the display, wherein:
   the first region of the display is visible through an opening in the case; and
   a second region of the display is covered by the case.

9. The method of claim 1, further comprising, in response to detecting the coupling of the case to the computer system and in accordance with the determination that the computer system is operating in the second audio mode:
   after terminating the call, displaying, in a first region of the display, a visual indication that the call has been terminated, wherein:
   the first region of the display is visible through an opening in the case; and
   a second region of the display is covered by the case.

10. The method of claim 1, further comprising, in response to detecting the coupling of the case to the computer system and in accordance with the determination that the computer system is operating in the first audio mode:
    displaying, in a first region of the display, a visual indication including information about the call, wherein:
    the first region of the display is visible through an opening in the case; and
    a second region of the display is covered by the case.

11. The method of claim 1, further comprising:
    prior to detecting the coupling of the case to the computer system and while the call is ongoing, displaying, on the display, a visual indication including call information associated with the call; and
    in response to detecting the coupling of the case to the computer system, reducing a size of the visual indication and displaying the reduced-size visual indication in a first region of the display, wherein:
    the first region of the display is visible through an opening in the case; and
    a second region of the display is covered by the case.

12. The method of claim 1, further comprising, in response to detecting the coupling of the case to the computer system and in accordance with a determination that the computer system is in a first state corresponding to a first authorization level when the coupling of the case is detected, transitioning the computer system to a second state corresponding to a second authorization level different than the first authorization level.

13. The method of claim 1, wherein:
    the call is a first call;
    the case is a first case of a first type;
    the remote device is a first remote device; and
    the method further comprises:
    while a second call is ongoing between the computer system and a second remote device, detecting a coupling of a second case to the computer system, the second case of a second type different than the first type; and in response to detecting the coupling of the second case to the computer system and in accordance with a determination that the computer system is operating in the first audio mode or the second audio mode, continuing the call.

14. The method of claim 1, wherein:

determining that the computer system is operating in the first audio mode comprises determining that the computer system is operating in a speakerphone mode at the time the first insertion of the computer system into the case is detected; and determining that the computer system is operating in the second audio mode comprises determining that the computer system is operating in a handset mode at the time the second insertion of the computer system into the case is detected.

15. An electronic device comprising:
a display;
a housing;
one or more processors;
memory; and
one or more programs stored in the memory and configured to be executed by the one or more processors and including instructions for:
while a call is ongoing between the electronic device and a remote device, detecting insertion of the electronic device into a case; and
in response to detecting the insertion of the electronic device into the case:
in accordance with a determination that the electronic device is operating in a first audio mode, continuing the call; and
in accordance with a determination that the electronic device is operating in a second audio mode different than the first audio mode, terminating the call.

16. The electronic device of claim 15, wherein the first audio mode is a speakerphone mode in which the electronic device is configured to produce an audio output that is audible to a user when the electronic device is away from an ear of the user.

17. The electronic device of claim 15, wherein the one or more programs further include instructions for:
while the call is ongoing:
outputting, via at least one of a speaker of the electronic device or a remote speaker communicatively coupled to the electronic device, audio content associated with the call; and
displaying, on the display, video content associated with the call; and
in response to detecting the coupling of the case to the electronic device and in accordance with the determination that the electronic device is operating in the first audio mode:
ceasing display of the video content; and
continuing to output the audio content.

18. The electronic device of claim 15, wherein:
the one or more programs further include instructions for:
prior to detecting the coupling of the case to the electronic device and while the call is ongoing, displaying, on the display, a visual indication including call information associated with the call; and
in response to detecting the insertion of the electronic device into the case, reducing a size of the visual indication and displaying the reduced-size visual indication in a first region of the display;
the first region of the display is visible through an opening in the case; and
a second region of the display is covered by the case.

19. The electronic device of claim 15, wherein:
the determination that the electronic device is operating in the first audio mode corresponds to a determination that the electronic device is operating in a speakerphone mode at the time the insertion of the electronic device into the case is detected; and
the determination that the electronic device is operating in the second audio mode corresponds to a determination that the electronic device is operating in a handset mode at the time the insertion of the electronic device into the case is detected.

20. A non-transitory computer readable storage medium storing one or more programs, the one or more programs comprising instructions, which when executed by an electronic device, cause the electronic device to:
while a call is ongoing between the electronic device and a remote device, detect insertion of the electronic device into a case; and
in response to detecting the insertion of the electronic device into the case:
in accordance with a determination that the electronic device is operating in a first audio mode, continue the call; and
in accordance with a determination that the electronic device is operating in a second audio mode different than the first audio mode, terminate the call.

21. The non-transitory computer readable storage medium of claim 20, wherein the first audio mode is a speakerphone mode in which the electronic device is configured to produce an audio output that is audible to a user when the electronic device is away from an ear of the user the user's ear.

22. The non-transitory computer readable storage medium of claim 20, wherein the one or more programs further comprise instructions, which when executed by the electronic device, cause the electronic device to:
while the call is ongoing:
output, via at least one of a speaker of the electronic device or a remote speaker communicatively coupled to the electronic device, audio content associated with the call; and
display, on a display of the electronic device, video content associated with the call; and
in response to detecting the insertion of the electronic device into the case and in accordance with the determination that the electronic device is operating in the first audio mode:
cease display of the video content; and
continue to output the audio content.

23. The non-transitory computer readable storage medium of claim 20, wherein:
the determination that the electronic device is operating in the first audio mode corresponds to a determination that the electronic device is operating in a speakerphone mode at the time the insertion of the electronic device into the case is detected; and
the determination that the electronic device is operating in the second audio mode corresponds to a determination that the electronic device is operating in a handset mode at the time the insertion of the electronic device into the case is detected.

* * * * *